(12) United States Patent
van Zelst et al.

(10) Patent No.: US 8,462,867 B2
(45) Date of Patent: *Jun. 11, 2013

(54) NEAR SOFT-OUTPUT MAXIMUM-LIKELIHOOD DETECTION FOR MULTIPLE-INPUT MULTIPLE-OUTPUT SYSTEMS

(75) Inventors: Albert van Zelst, Woerden (NL); Brian Wong, Pleasanton, CA (US); D. J. Richard van Nee, De Meern (NL); Vincent K. Jones, IV, Redwood City, CA (US); Geert Arnout Awater, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 1146 days.

This patent is subject to a terminal disclaimer.

(21) Appl. No.: 11/849,025

(22) Filed: Aug. 31, 2007

(65) Prior Publication Data

US 2009/0060078 A1   Mar. 5, 2009

(51) Int. Cl.
*H04L 5/12*  (2006.01)

(52) U.S. Cl.
USPC ............ 375/262; 375/260; 375/267; 375/340

(58) Field of Classification Search
USPC .................. 375/260, 267, 262, 340, 341, 324
See application file for complete search history.

(56) References Cited

U.S. PATENT DOCUMENTS

| 5,363,413 | A | | 11/1994 | Vos | |
|---|---|---|---|---|---|
| 5,852,630 | A | * | 12/1998 | Langberg et al. | ............. 375/219 |
| 7,433,432 | B2 | * | 10/2008 | Hoo | ............................... 375/347 |
| 7,751,506 | B2 | * | 7/2010 | Niu et al. | ........................ 375/341 |
| 7,848,461 | B2 | | 12/2010 | Vasil'evich et al. | |
| 2006/0148506 | A1 | * | 7/2006 | Hoo | ................................ 455/522 |
| 2007/0127603 | A1 | * | 6/2007 | Niu et al. | ........................ 375/341 |
| 2008/0137720 | A1 | * | 6/2008 | Waters et al. | .................. 375/230 |
| 2009/0190683 | A1 | * | 7/2009 | Awater et al. | .................. 375/262 |
| 2010/0150258 | A1 | * | 6/2010 | van Zelst | ....................... 375/267 |
| 2010/0232551 | A1 | * | 9/2010 | Ojard | ............................ 375/341 |
| 2011/0080981 | A1 | * | 4/2011 | Su et al. | ......................... 375/341 |

FOREIGN PATENT DOCUMENTS

| RU | 2303330 C1 | 7/2007 |
|---|---|---|
| WO | WO2005079031 | 8/2005 |
| WO | WO2005086440 | 9/2005 |

OTHER PUBLICATIONS

Hooli et al. (SubOptimal Soft-Output MAP Detector with Lattice Reduction; Jun. 2006; pp. 321-324).*
Fischer et al. (From Lattice-Reduction-Aided Detection Towards Maximu-Likelihood Detection in MIMO Systems; 2003; 1-5).*
Barry et al. (A Lattice-Reduction-Aided Soft Detector for Multiple-Input Multiput-Output Channels; IEEE 2006; pp. 1-5).*

(Continued)

*Primary Examiner* — Shuwang Liu
*Assistant Examiner* — Helene Tayong
(74) *Attorney, Agent, or Firm* — Kenyon S. Jenckes

(57) ABSTRACT

Systems and methodologies are described that provide low-complexity soft-output detection for MIMO communication systems. Looping can be performed over a set of constellation points per spatial stream to obtain distance metrics for each of a series of transmitted streams, for which values for the other transmitted streams can be estimated using a MIMO channel matrix and a sub-optimal MIMO algorithm. Examples of MIMO algorithms that can be utilized include Per-Stream List Detection (PSLD), Lattice-Reduced Detection (LRD), and a Guided-M Algorithm. Performance can be further improved by pre-processing the MIMO channel matrix and/or by utilizing techniques for Enhanced Metric Usage (EMU).

60 Claims, 14 Drawing Sheets

OTHER PUBLICATIONS

Hooli et al. (Sub-Optimal Soft-Output MAP Detector with Lattice Reduction in MIMO-OFDM System; IEEE 2006; pp. 1-5).*

Gibson J D et al: "A QRD-M/Kalman Filter-Based Detection and Channel Estimation Algorithm for MIMO-OFDM Systems" IEEE Transactions on Wireless Communications, IEEE Service Center, Piscataway, NJ, US, vol. 4, No. 2, Mar. 1, 2005, pp. 710-721, XP011129224 ISSN: 1536-1276 the whole document.

Huan Yao et al: "Lattice-reduction-aided detectors for MIMO communication systems" Globecom'02. 2002—IEEE Global Telecommunications Conference. Conference Proceedings. Taipei, Taiwan, Nov. 17-21, 2002; [IEEE Global Telecommunications Conference], New York, NY : IEEE, US, vol. 1, Nov. 17, 2002, pp. 424-428, XP010635986 ISBN: 978-0-7803-7632-8 the whole document.

International Search Report and Written Opinion—PCT/US2008/074695, International Search Authority—European Patent Office—Dec. 23, 2008.

Kawai H et al.: "Likelihood Function for QRM-MLD Suitable for Soft-Decision Turbo Decoding and Its Performance for OFCDM MIMO Multiplexing in Multipath Fading Channel" IEICE Transactions on Communications, Communications Society, Tokyo, JP, vol. E88-B, No. 1, Jan. 1, 2005, pp. 47-57, XP001221108 ISSN: 0916-8516 figure 1 p. 1142 p. 1144, last paragraph—p. 1145, left-hand column; figure 3.

Schenk T. C. W., et al., "Implementation of a MIMO OFDM-Based Wireless LAN System" IEEE Transactions on Signal Processing, IEEE Service Center, New York, NY, US, vol. 52, No. 2, Feb. 1, 2004, pp. 483-494, XP011105733 ISSN: 1053-587X p. 483, right-hand column—p. 484, left-hand column figures 1, 2 p. 488, right-hand column—p. 490, left-hand column.

M. Siti and M.P. Fitz, "On Reduced Complexity Soft-Output MIMO ML Detection", arXiv:cs.IT/0603096 v1, Mar. 24, 2006.

Taiwan Search Report—TW097133316—TIPO—Jan. 12, 2012.

Watanabe et al., "A Study on MIMO System with QR Decomposition and Soft Interference Canceller," Technical Report of the Institute of Electronics, Information and Communication Engineers, Nov. 10, 2005, vol. 105, No. 411, pp. 31-36, RCS 2005-112.

* cited by examiner

NEAR SOFT-OUTPUT MAXIMUM-LIKELIHOOD DETECTION FOR MULTIPLE-INPUT MULTIPLE-OUTPUT SYSTEMS

BACKGROUND

1. Field

The present disclosure relates generally to wireless communications and more specifically to techniques for signal detection in a wireless communication system.

2. Background

Wireless communication systems have become a prevalent means by which a majority of people worldwide have come to communicate. This is due in large part to the fact that recent advances in wireless communication technology have considerably improved the ability of such systems to carry data relating to voice, video, packet data, broadcast, messaging, and other services used in communication. In particular, multiple-input multiple-output (MIMO) communication systems are receiving increased attention due to their ability to improve the capacity of a wireless communication system through the use of multiple antennas for simultaneously transmitting and receiving data. Using a MIMO communication system, data can be divided into multiple streams, which can be sent and received simultaneously to improve system capacity without requiring significant additional spectrum or power.

In typical MIMO communication systems, data is transmitted by dividing the data into streams, grouping bits in each stream, mapping each group of bits to constellation points, and then transmitting the streams via multiple transmit antennas as modulated carrier waves based on the constellation points mapped for each stream. Once transmitted, the data passes through an effective MIMO channel, after which resulting spatial streams are received by multiple antennas at a receiver. Conventional MIMO receivers then employ a variety of signal detection techniques to obtain data from streams received at receive antennas. Once such technique, Soft-Output Maximum-Likelihood Detection (SOMLD), can obtain the expected value of a detected transmitted bit as well as the likelihood that the expected value is correct. Conventional SOMLD techniques require looping over all constellation points used by the transmitter for each transmitted stream and determining a distance metric for each constellation point to find the likelihood of each bit in the streams. However, to determine optimal distance metrics in conventional SOMLD, additional looping is required over all constellation points for all other streams, effectively requiring looping over all possible combinations of constellation points for all streams. This procedure has exponential computational complexity, which makes it prohibitively costly for many applications, including applications that could benefit from soft-output detection. Thus, there exists a need in the art for low-complexity techniques that achieve Maximum-Likelihood-Detection (MLD) performance or near-MLD performance for hard-decision output detection or that achieve SOMLD performance or near-SOMLD performance for soft-decision output signal detection in MIMO communication systems.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by providing low-complexity techniques for maximum-likelihood detection in MIMO communication systems that yield close-to-optimal distance metrics for soft-output generation. More particularly, systems and methodologies described herein can loop over all constellation points per spatial stream to obtain distance metrics for each stream. Instead of performing additional looping for all other streams within the calculations for a particular stream, values for the other streams that yield close-to-optimal distance metrics can be estimated using a MIMO channel matrix and a sub-optimal MIMO algorithm such as Per-Stream List Detection (PSLD), Lattice-Reduced Detection (LRD), or a Guided-M Algorithm as described herein. Performance can be further improved by pre-processing the MIMO channel matrix and/or by utilizing Enhanced Metric Usage (EMU) as further described herein.

According to an aspect, a method for generating soft-decision output values for a set of transmitted spatial streams in a multiple-input multiple-output (MIMO) communication system is described herein. The method can comprise looping over a plurality of constellation points for respective transmitted spatial streams to estimate values for other transmitted streams based at least in part on a sub-optimal MIMO algorithm. The method can further comprise determining a set of distance metrics as values of the plurality of constellation points for the respective transmitted spatial streams. In addition, the method can comprise generating soft-decision outputs for the respective transmitted streams based at least in part on the set of distance metrics.

Another aspect relates to a wireless communications apparatus that can include a memory that stores data relating to a set of received streams and a matrix corresponding to a channel through which a set of transmitted streams corresponding to the set of received streams were communicated. The wireless communications apparatus can further comprise a processor configured to loop over one or more constellation points for respective transmitted streams to determine estimated values for other transmitted streams and corresponding distance metrics using the matrix and a sub-optimal MIMO algorithm and to generate soft-decision outputs for the respective transmitted streams as log-likelihood ratios of the determined distance metrics.

Yet another aspect relates to an apparatus that provides low-complexity near-soft-output maximum likelihood detection for a series of transmitted streams. The apparatus can comprise means for looping over a set of constellation points for respective transmitted streams to estimate other elements using a sub-optimal MIMO algorithm. In addition, the apparatus can comprise means for determining distance metrics for the respective transmitted streams over the set of constellation points. Further, the apparatus can comprise means for obtaining soft-decision outputs for respective bits in the transmitted streams based on the determined distance metrics.

Still another aspect relates to a computer-readable medium having stored thereon computer-executable instructions for soft value generation for a set of transmitted streams in a wireless communication system. The instructions can comprise utilizing a channel matrix and a sub-optimal MIMO algorithm iteratively over a set of possible constellation points for respective transmitted streams in the set of transmitted streams to estimate corresponding values for other transmitted streams in the set of transmitted streams and to determine corresponding distance metrics. The instructions can additionally include obtaining soft-decision outputs for respective bits in the set of transmitted streams based on the distance metrics.

In accordance with another aspect, a processor is described herein that can execute computer-executable instructions for low-complexity soft-output detection in a MIMO receiver. The instructions can include looping over one or more constellation points for respective transmitted streams to estimate other elements and to determine corresponding distance metrics using a sub-optimal MIMO algorithm. Additionally, the instructions can comprise obtaining soft-decision outputs by calculating log-likelihood ratios for respective bits in the transmitted streams based on the distance metrics.

An additional aspect relates to a method for generating soft-decision output values for a set of transmitted spatial streams in a communication system. The method can comprise looping over a plurality of constellation points for respective transmitted spatial streams to estimate values for other transmitted streams based at least in part on a single-input single-output (SISO) algorithm. Further, the method can include determining a set of distance metrics as values of the plurality of constellation points for the respective transmitted spatial streams. The method can additionally include generating soft-decision outputs for the respective transmitted streams based at least in part on the set of distance metrics.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
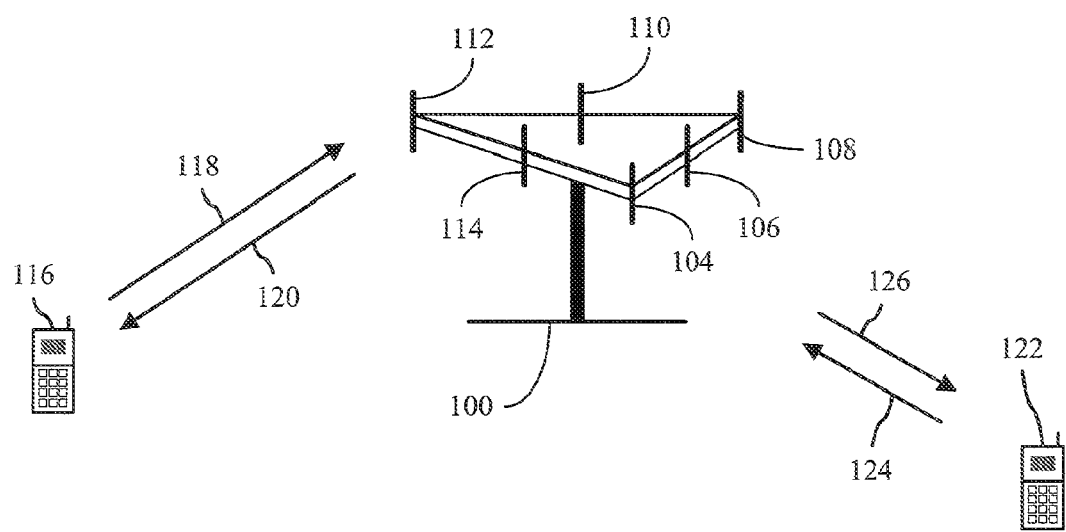
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In addition, while various embodiments are generally presented herein in the context of a wireless communication system, it should be appreciated that the systems and methodologies described herein can be utilized in connection with any suitable system and/or application that can employ wired and/or wireless communications. For example, various embodiments described herein can be used in MIMO systems employing IEEE 802.11n or a similar standard, Multi-User Detection applications, multi-mode fiber and fiber-optic applications, Ethernet communication systems and/or applications that can operate at 1 G, 10 G, or another suitable rate, and/or any other suitable communication systems or applications. Further, it should be appreciated that all such systems and applications are intended to fall within the scope of the hereto appended claims.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 104 and 106, where antennas 104 and 106 transmit information to access terminal 122 over forward link 126 and receive information from access terminal 122 over reverse link 124. In accordance with one aspect, access terminals 116 and 122 can have multiple antennas, with which multiple-input multiple-output (MIMO) communication can be established between access terminals 116 and 122 and access point 100 over respective forward links 120 and 126 and/or reverse links 118 and 124. Further, in a frequency division duplex (FDD) system, communication links 118, 120, 124 and 126 can use different frequencies for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
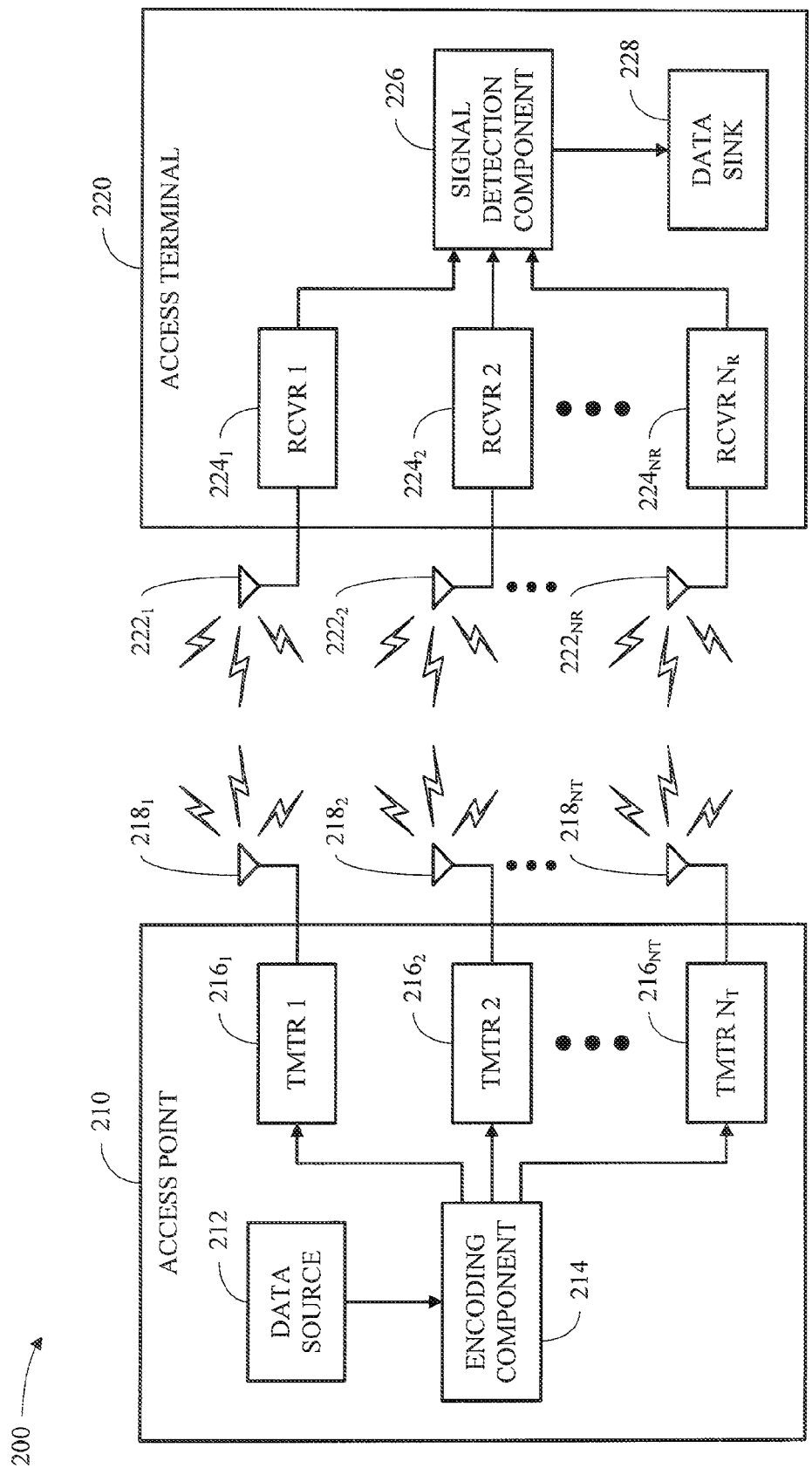
FIG. 2 is a block diagram of a multiple-input multiple-output (MIMO) wireless communication system that facilitates transmission and detection of spatial data streams in accordance with various aspects described herein.

FIG. 2 is a block diagram of a multiple-input multiple-output (MIMO) wireless communication system 200 that facilitates transmission and detection of spatial data streams in accordance with various aspects described herein. In one example, system 200 includes an access point (AP) 210 that can communicate with an access terminal (AT) 220. While only one AP 210 and AT 220 are illustrated in system 200 for brevity, it should be appreciated that system 200 can include any number of APs and/or ATs. Further, while the following discussion generally relates to communication from the AP 210 to the AT 220 (e.g., communication over forward links 120 and 126), it should be appreciated that similar components and techniques could be employed by the AP 210 and/or the AT 220 for communication from the AT 220 to the AP 210 (e.g., communication over reverse links 118 and 124).

In one example, AP 210 includes a data source 212 that can generate or otherwise obtain data for transmission to one or more ATs 220. Data from data source 212 can be sent to an encoding component 214 to process the data for communication to AT 220 via MIMO transmission. At encoding component 214, a series of bits comprising data to be transmitted to AT 220 can be grouped into spatial streams for simultaneous transmission by transmitters (TMTRs) 216 via antennas 218. Further, the encoding component can modulate each spatial stream using one or more digital modulation techniques, such as phase-shift keying (PSK), binary phase-shift keying (BPSK), quadrature phase-shift keying (QPSK), 16-point quadrature amplitude modulation (16-QAM), 64-point quadrature amplitude modulation (64-QAM), and/or another suitable modulation technique, under which bits of data comprising each stream can be mapped to a series of modulation symbols based on a set of constellation points. Additionally and/or alternatively, orthogonal frequency division multiplexing (OFDM) can be utilized to divide a spatial stream among multiple orthogonal subcarriers such that each subcarrier can be individually modulated using one or more modulation techniques. Mapped modulation symbols for each stream can then be provided to respective transmitters 216 for communication to AT 220 as modulated analog signals via a series of $N_T$ antennas 218.

At an AT 220, spatial streams corresponding to signals transmitted by the AP 210 can be received by a series of $N_R$ receivers (RCVRs) 224 via respective antennas 222. In one example, an $N_R$-dimensional receive vector y corresponding to the streams received at an AT 220 can be expressed as follows:

$$y=Hx+n, \quad (1)$$

where H is an NR×NT matrix that represents the effective MIMO channel through which transmitted signals pass between an AP 210 and an AT 220, x is an NT-dimensional transmit vector corresponding to the streams transmitted from an AP 210, and n is an NR-dimensional vector that represents additive noise.

In another example, spatial streams received by receivers 224 can be conveyed to a signal detection component 226, which can utilize the streams received by the receivers 224 and knowledge of the effective MIMO channel to obtain the streams transmitted by the AP 210. In accordance with one aspect, signal detection component 226 can determine hard-decision outputs for bits in spatial streams received from the AP 210 by determining the expected sign of each bit. For example, bits having a value of 1 can be represented by a hard-decision output of +1 while bits having a value of 0 can be represented by a hard-decision output of −1. Alternatively, signal detection component 226 can determine soft-decision outputs for bits in spatial streams received from the AP 210 by determining the expected sign of each bit in addition to the likelihood that the respective expected sign for each bit has been detected correctly, e.g., the likelihood that a bit was sent as +1 or −1. In accordance with another aspect, the signal detection component 226 can provide low-complexity soft-output detection by employing one or more near-Soft-Output Maximum Likelihood Detection (near-SOMLD) algorithms as described infra. After successful detection, the detected transmitted streams can be provided to a data sink 228 for use by the AT 220.

Figure 3:
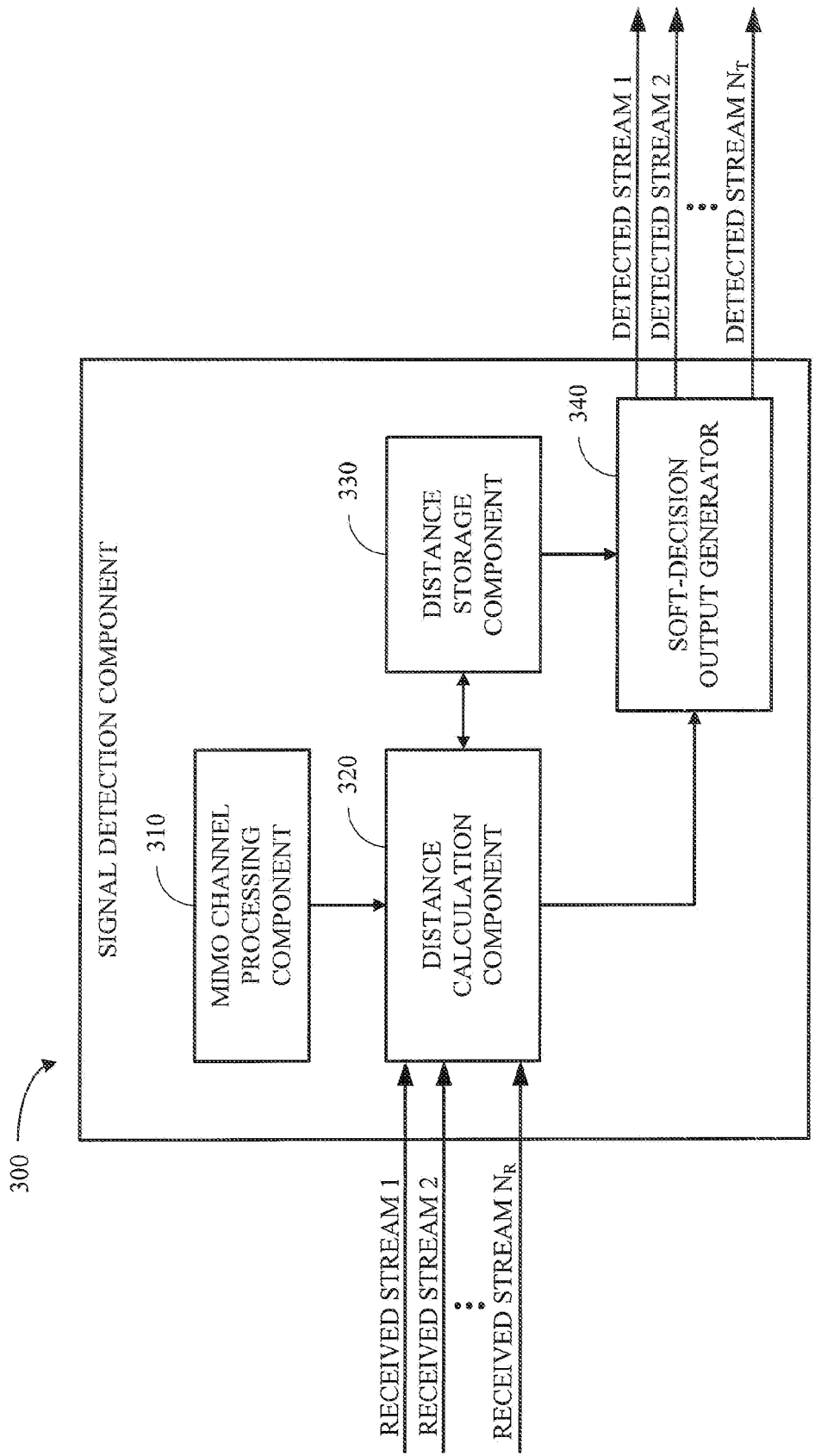
FIG. 3 illustrates an example signal detection component that can be utilized in a MIMO communication system in accordance with various aspects.

FIG. 3 is a block diagram illustrating an example signal detection component 300 that can be utilized in a MIMO communication system in accordance with various aspects. By way of specific, non-limiting example, signal detection component 300 can be used in MIMO systems employing IEEE 802.11n or a similar standard, Multi-User Detection applications, multi-mode fiber applications, and/or any other suitable communication systems or applications. Further, it should be appreciated that signal detection component 300 can be utilized by any appropriate network entity in a MIMO communication system, such as an access point (e.g., an AP 210), an access terminal (e.g., an AT 220), and/or any other suitable entity. In addition, a signal detection component 300 may be internal to an associated network entity or an external component that is communicatively connected to one or more associated network entities.

In accordance with one aspect, signal detection component 300 includes a MIMO channel processing component 310 that can determine and/or store information relating to an effective MIMO channel through which spatial streams are transmitted to a network entity (e.g., an AP 210 and/or an AT 220). In one example, a MIMO channel processing component 310 can represent channel information as a MIMO channel matrix, which can be similar in structure to MIMO channel matrix H utilized in Equation (1). By way of specific example, MIMO channel processing component 310 can obtain the MIMO channel matrix through training based on, for example, preambles attached to one or more packets received at signal detection component 300; through one or more blind and/or semi-blind channel estimation techniques; and/or through other suitable techniques.

In a specific example, MIMO channel processing component 310 can perform decomposition and/or other appropriate pre-processing techniques on a MIMO channel matrix prior to signal detection. It should be appreciated, however, that pre-processing need not be performed by the MIMO channel processing component 310 and that signal detection component 300 can perform signal detection using one or more techniques described infra with or without pre-processing by the MIMO channel processing component 310. By way of additional specific, non-limiting example, MIMO channel processing component 310 can pre-process a MIMO channel matrix by performing QR decomposition on the matrix. By utilizing QR decomposition, MIMO channel processing component 310 can represent a MIMO channel matrix H as a product of an orthogonal matrix Q and an upper triangular matrix R. After performing QR decomposition, the MIMO channel processing component 310 can communicate the decomposed channel matrix QR to one or more appropriate components either in place of or in addition to an unprocessed channel matrix H. In an additional example, MIMO channel processing component 310 can monitor for changes to the effective MIMO channel and can adjust the channel matrix accordingly.

In accordance with another aspect, signal detection component 300 includes a distance calculation component 320. Distance calculation component 320 can obtain a series of received streams, which can be communicated by an array of receivers (e.g., receivers 224) and/or other suitable components or network entities. Alternatively, distance calculation component 320 and/or other sub-components in signal detection component 300 can receive soft-decision input values corresponding to a series of received streams, based on which signal detection component 300 can perform near-soft-output maximum a posteriori probability (MAP) detection based on one or more of the signal detection algorithms described infra.

In one example, distance calculation component 320 receives a series of spatial streams corresponding to a receive vector y as utilized in Equation (1). Based on the receive vector y and a MIMO channel matrix H received from MIMO channel processing component 310, distance calculation component 320 can determine distances between transmitted streams in a transmit vector x and all possible constellation point combinations used to modulate those streams (e.g., by an encoding component 214). These determined distances can then be used by a soft-decision output generator 340 to determine soft-decision outputs reflecting expected values of bits in the transmitted streams as well as their respective likelihoods. In accordance with one aspect, soft-decision outputs generated by soft-decision output generator 340 that correspond to detected streams can then be utilized by a decoder (not shown) that can utilize an "outer code" to further process the streams. An outer code utilized by the decoder can have error corrective ability that can, for example, introduce redundancy to improve the quality of wireless communication links to and/or from an entity employing signal detection component 300. Further, an outer code utilized by the decoder can be a convolutional code, a low-density parity check (LDPC) code, and/or another appropriate type of code.

In another example, distance calculation component 320 can employ one or more near-Soft-Output Maximum Likelihood Detection (near-SOMLD) algorithms by looping over a set of constellation points used to modulate transmitted streams to determine distances between the transmitted streams and the constellation points. These distances can be determined, for example, by using a distance metric such as the approximated $l^1$-norm, the $l^1$-norm, the $l^2$-norm, the $l^\infty$-norm, and/or another suitable distance metric. In conventional hard-decision MLD, calculating an optimal distance metric for each stream requires looping over all possible constellation points for all streams. Thus, in the specific example of $N_T$ transmitted streams respectively modulated using a constellation of size M, conventional MLD requires distance calculation for $M^{N_T}$ possible constellation point combinations. As a result, conventional MLD has exponential computational complexity and is prohibitively complex for many applications. QR decomposition can be applied to conventional MLD to allow the final dimension of the required calculations to be obtained through slicing. However, such an algorithm retains exponential complexity as, for example, $M^{N_T-1}$ calculations are required where a constellation of size M is utilized to modulate $N_T$ transmitted streams. Similarly, QR-decomposed SOMLD requires looping over all $N_T$ transmitted streams such that each stream can be represented as the final dimension and found through slicing, resulting in a complexity order of $N_T M^{N_T-1}$. In contrast, distance calculation component 320 can calculate distance metrics for transmitted streams over constellation points by utilizing techniques for estimating values used for calculation via one or more sub-optimal MIMO algorithms such as Per-Stream List Detection (PSLD), Lattice-Reduced Detection (LRD), the Guided-M algorithm, and/or other appropriate algorithms, such that looping over all possible constellation points is not required. As a result, distance calculation component 320 can significantly lower required complexity for soft-output detection while still providing close to optimal distance metrics. In an additional example, distance calculation component 320 can interact with a distance storage component 330 that can store calculated distance metrics to further improve distance calculation and usage by signal detection component 300. By way of specific example, distance storage component 330 can be used to provide Enhanced Metric Usage (EMU) as described infra.

In accordance with a further aspect, signal detection component 300 can include a soft-decision output generator 340 that can utilize distance metrics found for a series of transmitted streams to generate soft-decision outputs relating to the expected values and likelihoods of individual bits in the transmitted streams. In one example, the soft-decision output generator 340 can receive distance metrics relative to a set of constellation points for a stream $x_p$ in a transmit vector x from distance calculation component 320 and/or distance storage component 330. Based on these distance metrics, a soft-decision output value can be derived per bit that represents $x_p$ by, for example, using a Log-Likelihood Ratio (LLR). In one example, soft-decision output generator 340 can calculate an approximation of the LLR for a kth bit $b_k$ that represents $x_p$ as follows:

$$L(b_k) = \frac{1}{\sigma_n^2}\left( \min_{x_p|b_k=0} d(x_p) - \min_{x_p|b_k=1} d(x_p) \right) \quad (2)$$

where $d(x_p)$ is a distance metric received from the distance calculation component 320 and/or distance storage component 330 as a function of $x_p$, the minima are searched over all values (e.g., all possible constellation points) of $x_p$ for which $b_k=0$ and $b_k=1$, respectively, and $\sigma_n^2$ denotes the noise variance of additive noise n as utilized in Equation (1). Alternatively, it should be appreciated that the soft-decision output generator can utilize any other suitable soft-decision technique either in addition to or in place of the LLR calculation. Further, soft-decision outputs can further be quantized into a predetermined number of bits after calculation thereof. After the soft-decision outputs are generated, they can be provided as detected stream output from the signal detection component 300. Additionally and/or alternatively, the soft-decision output generator 340 can provide hard-decision outputs per bit in the transmitted streams by, for example, determining the sign of respective soft-decision outputs.

Referring to FIGS. 4-8, methodologies for signal detection in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 4:
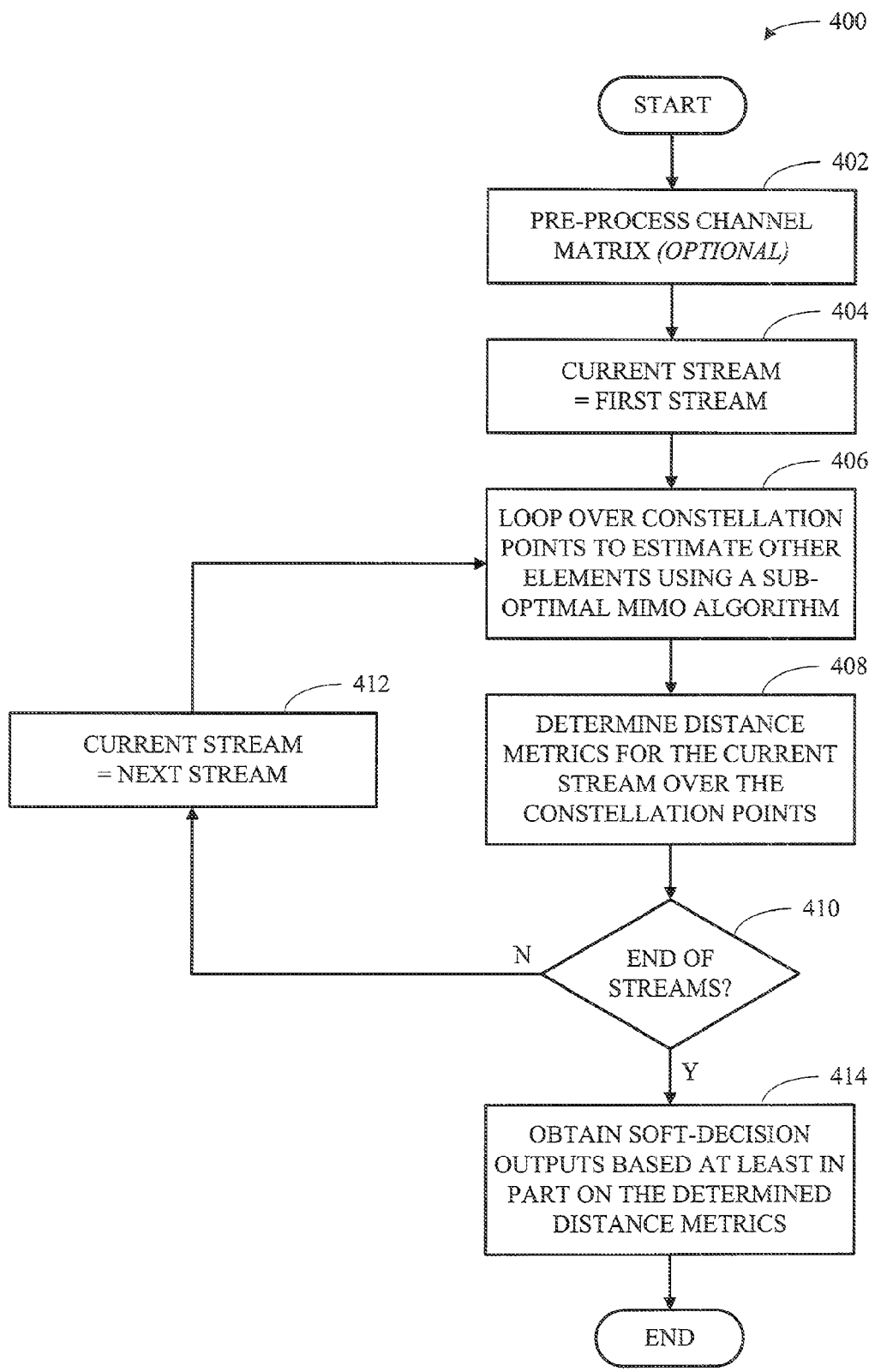
FIG. 4 is a flow diagram of a methodology for low-complexity near-soft-output maximum likelihood detection (near-SOMLD) in a MIMO communication system.

With reference to FIG. 4, illustrated is a methodology 400 for low-complexity near-soft-output maximum likelihood detection (near-SOMLD) in a MIMO communication system (e.g., a communication system 200). It is to be appreciated that methodology 400 can be performed by a base station (e.g., an AP 210), a mobile terminal (e.g., an AT 220), and/or any other suitable entity in a wireless communication network. Methodology 400 begins at block 402, wherein pre-processing is performed on a channel matrix (e.g., by a MIMO channel processing component 310 at a signal detection component 300) that represents the effective MIMO channel between a transmitting entity and a receiving entity in the MIMO system. By way of specific, non-limiting example, pre-processing performed at block 402 can include QR decomposition, wherein a channel matrix H is decomposed into a product QR of a unitary or orthonormal matrix Q and an upper triangular matrix R. Alternatively, matrix Q can be an orthogonal matrix. It should be appreciated, however, that QR decomposition is only one example of pre-processing that can be performed at block 402 and other pre-processing and/or matrix decomposition techniques can be performed in addition to or in place of QR decomposition. Further, it should be appreciated that the pre-processing at block 402 is optional and need not be performed in methodology 400. After the optional pre-processing at block 402, methodology 400 is initialized for a first transmitted stream at block 404. Methodology 400 can then proceed for respective transmitted streams to be detected as illustrated by blocks 406-410. In one example, the transmitted streams utilized at blocks 406-410 can be represented by a transmit vector x as used in Equation (1).

In one example, methodology 400 can proceed for each transmitted stream to be detected at blocks 406-410 as follows. At block 406, each stream is looped over a set of constellation points (e.g., by a distance calculation component 320 at a signal detection component 300) to estimate other elements using a sub-optimal MIMO algorithm. Elements estimated at block 406 can be, for example, other transmitted streams and/or any other elements necessary to compute distance metrics at block 408. In addition, the set of constellation points can represent a set of modulation symbols used by an entity in the MIMO system that transmitted the streams to be detected by methodology 400. As generally described supra, by estimating the other elements for each stream at block 406 for the set of constellation points, it is not necessary to loop over all possible combinations of constellation points for each transmitted stream as is required in conventional SOMLD algorithms. As a result, signal detection complexity can be greatly reduced while still allowing the calculation of close to optimal distance metrics and soft outputs. By way of specific, non-limiting example, sub-optimal MIMO algorithms that can be used at block 406 include Per-Stream List Detection (PSLD), Lattice-Reduced Detection (LRD), a Guided-M algorithm, Zero Forcing (ZF), a Minimum Mean Square Error (MMSE) algorithm, and/or another suitable algorithm. Example algorithms are detailed in the following drawings and related description.

After looping completes for each stream at block 406, methodology 400 proceeds to block 408, wherein distance metrics for the current stream are determined over the constellation points looped over in block 406 (e.g., by a distance calculation component 320 at a signal detection component 300). In one example, the distance metrics are obtained by using a channel matrix representing the effective MIMO channel over which the transmitted streams were received, which may or may not be pre-processed at block 402. Additionally, distance metrics at block 408 can be determined by using a distance metric such as the approximated $l^1$-norm, the $l^1$-norm, the $l^2$-norm, the $l^\infty$-norm, and/or another suitable distance metric.

After the distance metrics for the current stream are determined at block 408, methodology 400 then proceeds to block 410 to determine whether further transmitted streams are present. If further streams are present, methodology 400 advances to the next transmitted stream at block 412 and repeats blocks 406-410 for said stream. If no further transmitted streams are present, methodology 400 concludes at block 414 by obtaining soft-decision outputs based on the distance metrics determined at block 408 for each stream (e.g., via a soft-decision output generator 340 at a signal detection component 300). By way of specific, non-limiting example, soft-decision outputs can be generated at 414 by determining Log-Likelihood Ratios (LLRs) for each bit in the transmitted streams based on the distance metrics calculated at block 408. It should be appreciated, however, that other techniques for soft-output generation could be utilized at block 414. In addition, it should be appreciated that hard-decision outputs can also be generated at block 414 by, for example, determining the sign of respective soft-decision outputs. In another example, hard-decision outputs for a transmitted stream can be generated by performing reverse constellation mapping for a constellation point that minimizes a distance metric calculated at block 408 for the transmitted stream. Accordingly, a hard-decision output for a transmitted stream $x_3$ can be determined by searching for a minimum distance metric $d(x_3)$ calculated at block 408 and its corresponding value $x_3$. Based on the determined $x_3$ value, the reverse of the constellation mapping can be used to obtain the bits of the determined $x_3$ value and the values estimated for its corresponding $x_2$ and $x_1$ at block 406.

Figure 5:
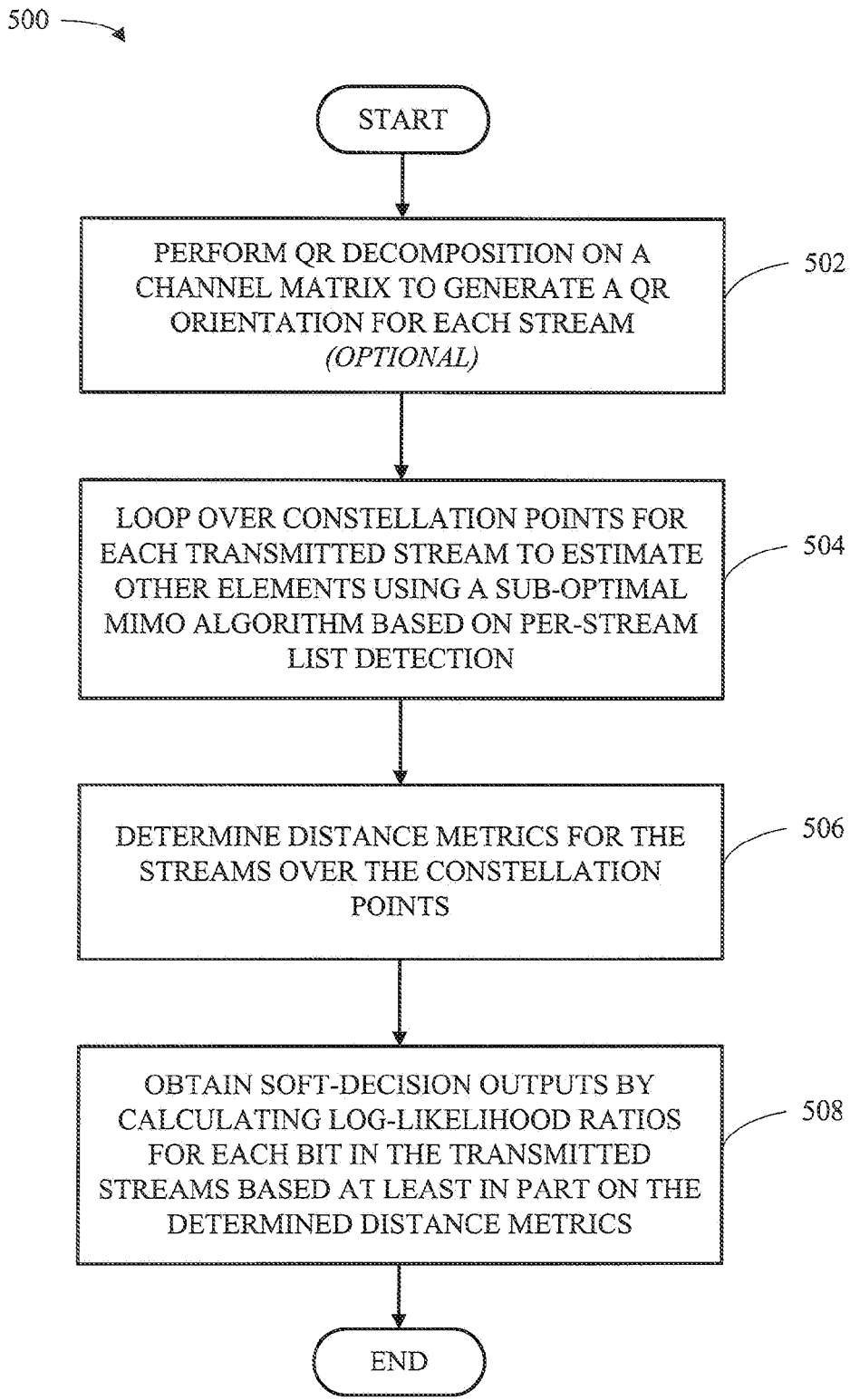
FIG. 5 is a flow diagram of a methodology for near-SOMLD in a MIMO communication system using a Per-Stream List Detection algorithm.

FIG. 5 illustrates a methodology 500 for near-SOMLD in a MIMO communication system using a Per-Stream List Detection (PSLD) algorithm. Methodology 500 can be performed by a base station, a mobile terminal, and/or any other suitable entity in a wireless communication network. In the following description, PSLD is generally described for a series of 3 transmitted streams (e.g., from 3 transmit antennas 218 at an AP 210). It should be appreciated, however, that methodology 500 can be similarly applied for any number of transmitted streams. Further, the following description relates to a specific, non-limiting example of PSLD wherein the approximated $l^1$-norm is used as distance metric as follows:

$$d = |\text{Re}(y_1 - (h_{11}\ h_{12}\ h_{13})x)| + |\text{Im}(y_1 - (h_{11}\ h_{12}\ h_{13})x)| + \ldots + \quad (3)$$
$$|\text{Re}(y_{N_r} - (h_{N_r 1}\ h_{N_r 2}\ h_{N_r 3})x)| +$$
$$|\text{Im}(y_{N_r} - (h_{N_r 1}\ h_{N_r 2}\ h_{N_r 3})x)|.$$

However, it should be appreciated that other norms can also be used for the distance metric.

Methodology 500 can begin at block 502, wherein QR decomposition is performed on a channel matrix representing the effective MIMO channel to generate a QR orientation for each transmitted stream. In one example, QR decomposition can be performed at block 502 for three permutations of a channel matrix H as used in Equation (1) such that every row of H is permuted to be the last row only once. QR decomposition can then be performed on each permutation to obtain three QR "orientations." While the discussion of the following blocks in FIG. 5 generally relates to calculating soft-decision outputs based on QR orientations for each transmitted stream, it should be appreciated that QR decomposition at block 502 is optional and need not be performed as part of methodology 500 and that methodology 500 can be performed for a non-decomposed channel matrix in a similar manner to the following description.

Methodology 500 next proceeds to block 504, wherein looping over a set of constellation points is performed for each transmitted stream in order to estimate other elements needed for distance calculation using a sub-optimal MIMO algorithm based on PSLD. By way of specific, non-limiting example, estimation can be performed by utilizing zero forcing (ZF), ZF with Successive Interference Calculation, Minimum Mean Square Error (MMSE) estimation, and/or other suitable sub-optimal MIMO algorithms. While the following relates to the specific example of ZF with Successive Interference Cancellation, it is to be appreciated that any sub-optimal MIMO algorithm could similarly be used at block 504, and it is further to be appreciated that all such algorithms are intended to fall within the scope of the hereto appended claims.

Per received MIMO vector y, three QR orientations as generated at block 502 can be used to loop over all transmitted streams, herein denoted as $x_3$, $x_2$, and $x_1$, respectively. For brevity, the following description relates only to acts performed at block 504 for the first orientation, with $H_{permuted}=H=QR$, and only describes the loop over the set of constellation points for transmitted stream $x_3$. It should be appreciated, however, that the described acts at block 504 can be similarly performed for other transmitted streams.

In one example, the estimation at block 504 for transmitted stream $x_3$ can proceed as follows. Prior to looping over the constellation points, an intermediate vector y' can be determined by using the equation $y'=Q(1:N_R,1:N_T)^H y$, where $Q(1:N_R, 1:N_T)$ represents the set of elements in Q having indices of 1 to $N_R$ by 1 to $N_T$. From the intermediate vector y', the transmitted stream $x_3$ can be looped over the set of constellation points to determine a second intermediate vector y'' for each possible value of $x_3$ by using the equation $y''=y'-R(1:3, 3)x_3$. Based on the intermediate vectors y'' determined for each constellation point, corresponding transmitted streams $x_2$ can be estimated by using the equation $x_2=\text{Slice}(y''_2/r_{22})$, where $Y''_2$ is the second element of y'', Slice( ) is a slicing operation to the nearest constellation point, and $r_{22}$ is entry (2,2) of R. By finding $x_2$, an $l^1$-norm approximation of $y''_2-r_{22}x_2$ that can be used at block 506, which is $|\text{Re}(y''_2-r_{22}x_2)|+|\text{Im}(y''_2-r_{22}x_2)|$, can then be determined. Based on this, a third intermediate value $y'''_1$ can be calculated using the equation $y'''_1 = y''_1 - r_{12}x_2$, and from this equation transmitted stream $x_1$ can be estimated using the equation $x_1 = \text{Slice}(y'''_1/r_{11})$. From the estimated value of $x_1$, an $l^1$-norm approximation of $y'''_1 - r_{11}x_1$ that can be utilized at block 506, which is $|\text{Re}(y'''_1 - r_{11}x_1)| + |\text{Im}(y'''_1 - r_{11}x_1)|$, can be determined.

After estimation is performed at block 504, methodology 500 can proceed to block 506, wherein distance metrics are determined for the transmitted streams over the constellation points. While blocks 504 and 506 are illustrated as two separate acts in methodology 500, it should be appreciated that the acts described at blocks 504 and 506 can be executed together, e.g., distance metrics can be calculated at block 506 after each constellation point looped over at block 504, or alternatively distance metrics at block 506 can be calculated for each stream for which looping is performed at block 504. By way of specific, non-limiting example, distance metric calculation at block 506 can be performed as follows. First, for a transmitted stream $x_3$, a distance metric can be calculated for respective possible constellation points for transmitted stream $x_3$ using the approximated $l^1$-norm given by Equation (3) as follows:

$$d(x_3) = |\text{Re}(y'''_1 - r_{11}x)| + |\text{Im}(y'''_1 - r_{11}x_1)| + \quad (4)$$
$$|\text{Re}(y''_2 - r_{22}x_2)| + |\text{Im}(y''_2 - r_{22}x_2)| + |\text{Re}(y''_3)| + |\text{Im}(y''_3)|$$

Similar looping and distance metric calculation can then be performed for transmitted streams $x_2$ and $x_1$ at blocks 504 and 506 to obtain distance metrics for each possible constellation point in each transmitted stream.

After distance metrics for the transmitted streams are calculated at block 506, methodology 500 can conclude at block 508 by obtaining soft-decision outputs by calculating log-likelihood ratios (LLRs) for each bit in the transmitted streams based at least in part on the distance metrics determined at block 506. By way of specific example, LLRs can be determined for a kth bit $b_k$ in a transmitted stream $x_1$ using the LLR expression given by Equation (2) as follows:

$$L(b_k) = \frac{1}{\sigma_n^2} \left( \min_{x_1 | b_k = 0} d(x_1) - \min_{x_1 | b_k = 1} d(x_1) \right). \quad (5)$$

Additionally, LLRs for the other transmitted streams in x can be computed using similar LLR expressions to those given in Equations (2) and (5).

Figure 6:
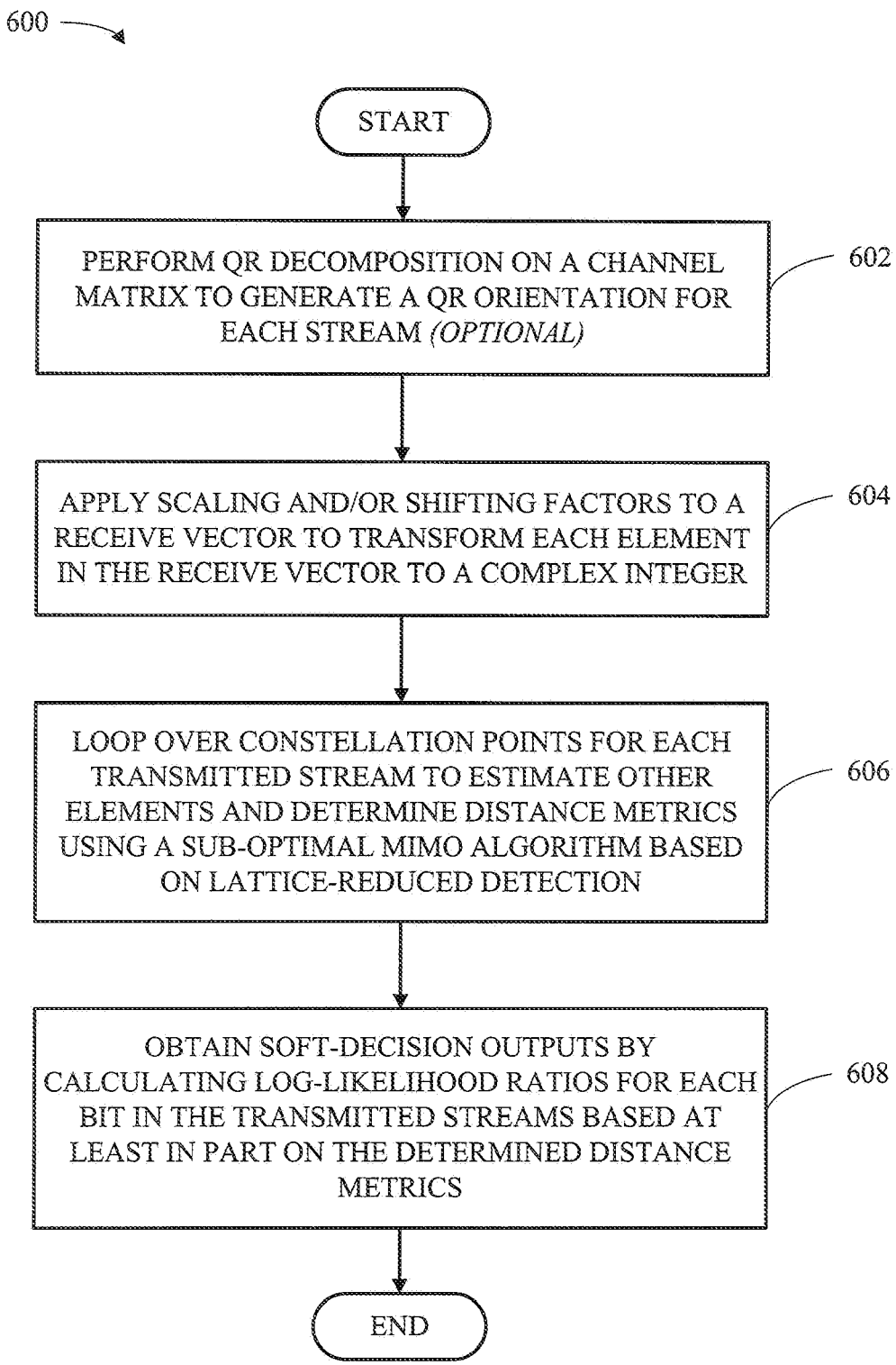
FIG. 6 is a flow diagram of a methodology for near-SOMLD in a MIMO communication system using a Lattice-Reduced Detection algorithm.

FIG. 6 illustrates a methodology 600 for near-SOMLD in a MIMO communication system using a Lattice-Reduced Detection (LRD) algorithm. Methodology 600 can be performed by a base station, a mobile terminal, and/or any other suitable entity in a wireless communication network. In the following description, LRD is generally described for a series of 3 transmitted streams (e.g., from 3 transmit antennas 218 at an AP 210). It should be appreciated, however, that methodology 600 can be similarly applied for any number of transmitted streams.

Methodology 600 can begin at block 602, wherein QR decomposition is performed on a channel matrix representing the effective MIMO channel to generate a QR orientation for each transmitted stream. In one example, QR decomposition can be performed at block 602 for three permutations of a channel matrix H as used in Equation (1) such that every row of H is permuted to be the last row only once. QR decomposition can then be performed on each permutation to obtain three QR "orientations." While the discussion of the following blocks in FIG. 6 generally relates to calculating soft-decision outputs based on QR orientations for each transmitted stream, it should be appreciated that QR decomposition at block 602 is optional and need not be performed as part of methodology 600 and that methodology 600 can be performed for a non-decomposed channel matrix in a similar manner to the following description.

Methodology 600 next proceeds to block 604, wherein scaling and/or shifting factors are applied to a receive vector to transform each element in the receive vector to a complex integer. This can be performed, for example, to facilitate Lattice-Basis Reduction (LBR) at block 606. In one example, the receive vector utilized at block 604 can be a receive vector y as used in Equation (1), which can be obtained from a set of receivers and/or other suitable components. In accordance with one aspect, LRD performed in methodology 600 is based on LBR. Under LBR, a matrix P is determined such that both P and $P^{-1}$ consist only of complex integer entries and such that H'=HP, where H' is another basis, is more orthogonal. Thus, a point y represented by x in the basis H can be represented by $z = P^{-1}x$ in the basis H', and this can be expressed by using the equation $y = Hx = (HP)(P^{-1}x) = H'z$. Further, if x is a vector having complex integer constellation points, simple rounding in the "z-domain" can be used for element estimation at block 608 since $P^{-1}$ has complex integer entries.

Accordingly, scaling and shifting can be performed on y at block 604 to transform the MIMO system model into complex integer representations that can be used for LBR and LRD. In one example, the vector y can be scaled and shifted as follows to obtain a scaled and shifted version $y_{s+s}$:

$$y = Hx + n$$

$$y_{s+s} = c_{scale}y + Hc_{shift}$$

$$y_{s+s} = H(c_{scale}x + c_{shift}) + c_{scale}n'$$

$$y_{s+s} = Hs + n' \quad (6)$$

where $c_{scale} = 0.5\sqrt{((M-1)/1.5)}$, M is the size of the constellation used for transmission of the streams to be detected (e.g., the size of an M-QAM modulation scheme utilized by an encoding component 214), and $c_{shift}$ is an $N_T$-dimensional vector with all elements equal to $-0.5 - 0.5j$. In one specific example, x consists solely of constellation points in a modulation scheme used for transmission, and as a result s is its complex integer representation.

From the above, it can be observed that the second line of Equation (6) can be applied at block 604 to transform a received vector into a format suitable for LBR to be performed at block 606. Further, it can be observed that the transformation given by Equation (6) can result in better performance with sub-optimal MIMO detection techniques. For example, "simple" Zero-Forcing (ZF) MIMO detection is applied by multiplying $y_{s+s}$ by $(HP)^{-1}$ as follows:

$$(HP)^{-1}y_{s+s} = (HP)^{-1}HPP^{-1}s + n' \quad (7)$$
$$= P^{-1}s + (HP)^{-1}n'.$$

Since HP is more orthogonal than H, and as a result $(HP)^{-1}n'$ does not cause as much noise enhancement as $H^{-1}n$ in "plain" ZF, improved performance can be achieved by utilizing Equation (7). Furthermore, since $P^{-1}s$ can be composed of complex integer values, slicing operations with respect to z can be performed using simple rounding operations. The estimates of z and s can then be found as follows:

$$z_{est} = \text{round}(P^{-1}s + (HP)^{-1}n')$$

$$s_{est} = Pz_{est} \qquad (8)$$

As one of ordinary skill in the art can appreciate, it may be difficult to consider constellation boundaries with respect to z. As a result, estimated values for s or x may fall outside the constellation boundaries with respect to s or x. Accordingly, an extra slicing step would be needed for hard-decision output decoding to obtain constellation points within the constellation boundaries. However, it should be appreciated that the extra slicing step is not always required for soft-decision output decoding, as it may be better for performance and complexity to carry out detection with respect to s, for example, by using the equation $s_{est} = Pz_{est}$. Based on this, the Euclidean distance metric then becomes the following:

$$d^2 = \|y - Hx_{est}\|^2 \qquad (9)$$
$$\approx \frac{1}{c_{scale}^2} \|y_{s+s} - Hs_{est}\|^2$$
$$= \frac{1}{c_{scale}^2} \|y_{s+s} - HPz_{est}\|^2$$

Once scaling and shifting is performed at block 604, methodology 600 can proceed to block 606, wherein looping over a set of constellation points is performed for each transmitted stream in order to estimate other elements needed for distance calculation using a sub-optimal MIMO algorithm based on MRD. In one example, looping is performed per spatial stream at block 606 over the possible constellation points of that spatial stream and LBR is used to estimate the other two spatial streams. While the following description relates to performing LBR on a channel matrix decomposed using QR decomposition, it should be appreciated that similar techniques can be utilized for performing LBR on a non-decomposed channel matrix or a channel matrix decomposed using another decomposition technique. Further, while the following description generally relates to a series of three transmitted streams, it should be appreciated that similar techniques can be utilized to detect any number of transmitted streams.

In a specific example, a first QR orientation can be applied on the normal order of $H = [h_1\ h_2\ h_3]$, and looping can be performed at block 606 for all possible values (e.g., all possible constellation points) of transmitted stream $x_3$. Then for the first QR orientation, with $H_{permuted} = H = QR$, LBR can be performed on the first two rows of R to obtain a modified Q and R, which can be expressed as $Q_{LR}$ and $R_{LR}$, such that $Q_{LR}(1:N_r,1:N_t)R_{LR}(1:N_r,1:N_t) = H_{permuted}P'$, where P' has the following structure:

$$P' = \begin{pmatrix} p_{11} & p_{12} & 0 \\ p_{21} & p_{22} & 0 \\ 0 & 0 & 1 \end{pmatrix} = \begin{pmatrix} P & 0_{2\times 1} \\ 0_{1\times 2} & 1 \end{pmatrix}. \qquad (10)$$

Because looping is performed at block 606 for all values of $x_3$, it should be appreciated that there is no need to affect the last column of $H_{permuted}$ by the LBR.

In another specific example, the LBR on $R(1:N_T-1, 1:N_T)$ (e.g., on $R(1:2, 1:3)$) is detailed by the following pseudo code in Table 1.

TABLE 1

Pseudo code for LBR on $R(1:N_T-1, 1:N_T)$.

```
(initialization)
k = 2
Q'_LR = Q(1:Nr,1:Nt-1)
R'_LR = R(1:Nt-1,1:Nt)
   (P is the two dimensional identity matrix)
P = I_{Nt-1}
   (actual LBR)
while k <= Nt-1
   for ii = k-1:-1:1
       mu = round(R'_LR(ii,k) / R'_LR(ii,ii))
       if mu ~= 0
           R'_LR(1:ii,k) = R'_LR(1:ii,k) - mu * R'_LR(1:ii,ii)
           P(:,k) = P(:,k) - mu * P(:,ii)
       end
   end
   delta = 0.75
   if delta * R'_LR(k-1,k-1)^2 > RT'_LR(k,k)^2 +
       abs(R'_LR(k-1,k))^2
       (swap columns of R'_LR and P)
       r_temp = R'_LR(:,k)
       R'_LR(:,k) = R'_LR(:,k-1)
       R'_LR(:,k-1) = r_temp
       p_temp = P(:,k)
       P(:,k) = P(:,k-1)
       P(:,k-1) = p_temp
       (Make sure R maintains its upper triangular structure)
       alpha = R'_LR(k-1,k-1)/norm(R'_LR(k-1:k,k-1))
       beta = R'_LR(k,k-1)/norm(R'_LR(k-1:k,k-1))
       G = [-alpha beta; -beta -conj(alpha)]
       R'_LR(k-1:k,k-1:Nt) = G^H * R'_LR(k-1:k,k-1:Nt)
       Q'_LR(:,k-1:k) = Q'_LR(:,k-1:k) * G
       k = max(k-1,2)
   else
       k = k+1
end
end
Q_LR(1:Nr,1:Nt-1) = Q_LR'
R_LR(1:Nt-1,1:Nt) = R_LR'
(the 3rd column of Q_LR equals the 3rd column of Q)
Q_LR(1:Nr,Nt) = Q(1:Nr,Nt)
(the 3rd row of R_LR equals the 3rd row of R)
R_LR(Nt,1:Nt) = R(Nt,1:Nt)
```

As the pseudo code in Table 1 illustrates, a check is performed on the number of times, denoted by the variable mu, the target column of R can be subtracted from the other columns. Next, it is determined whether the column with the most power is the rightmost column (i.e., the $(N_T-1)$th column). If the column with the most power is not the rightmost column, the rightmost column and the column with the most power are swapped. After swapping columns, a rotation matrix can then be applied to maintain the upper triangular structure of R.

In one example, by using the LBR operation described above, looping performed at block 606 can proceed as follows. While the following description relates to looping for a third transmitted stream $x_3$, it should be appreciated that looping can be similarly performed at block 606 for other transmitted streams. First, based on a scaled and shifted received vector $y_{s+s}$ obtained at block 604, which can be expressed as follows:

$$y_{s+s} = c_{scale}y + H_{permuted}c_{shift}, \qquad (11)$$

an intermediate vector y' can be determined by using the equation $y' = Q_{LR}(1:N_r,1:N_t)^H y_{s+s}$. Based on the vector y', the transmitted stream $x_3$ can be looped over the set of possible constellation points to determine a second intermediate vector y" for each possible value of $x_3$ by using the equation $y" = y' - R_{LR}(1:3,3)z_3$, where $R_{LR}(1:3,3)$ are the first three elements of the third column of $R_{LR}$ and $z_3 = c_{scale}x_3 + c_{shift}$, where $c_{shift}$ is one entry of $c_{shift}$. In one example, respective values of $z_3$ can be pre-calculated prior to looping at block 606. Based on the intermediate vectors y" determined for each constellation point, a corresponding value for $z_2$ can be estimated by using the equation $z_2$=round(y"$^2$/$r_{LR,22}$), where Y"$_2$ is the second element of y", round( ) is a rounding operation to the nearest complex integer, and $r_{LR,22}$ is entry (2,2) of $R_{LR}$. By finding $z_2$, the $l^1$-norm approximation of y"$_2$−$r_{LR,22}z_2$, which is |Re(y"$_2$−$r_{LR,22}z_2$)|+|Im(y"$_2$−$r_{LR,22}z_2$)|, can then be determined. Based on this, a third intermediate value y'"$_1$ can be calculated using the equation y'"$_1$=y"$_1$−$r_{LR,12}z_2$, and from this equation a corresponding value for $z_1$ can be estimated using the equation $z_1$=round(y'"$_1$/$r_{LR,11}$). From the estimated value of $x_1$, an $l^1$-norm approximation of y'"$_1$−$r_{LR,11}z_1$ that can be utilized at block 606, which is |Re(y'"$_1$−$r_{LR,11}z_1$)|+|Im(y'"$_1$−$r_{LR,11}z_1$)|, can be determined.

Based on these calculations, for transmitted stream $x_3$, a distance metric can then be calculated for each possible value (e.g., each possible constellation point) for $x_3$ using the approximated $l^1$-norm given by Equation (3) as follows:

$$d(x_3) = |\text{Re}(y_1''' - r_{LR,11}z_1)| + |\text{Im}(y_1''' - r_{LR,11}z_1)| + \qquad (12)$$
$$|\text{Re}(y_2'' - r_{Lr,22}z_2)| + |\text{Im}(y_2'' - r_{LR,22}z_2)| + |\text{Re}(y_3'')| + |\text{Im}(y_3'')|$$

Similar looping and distance metric calculation can then be performed at block 606 to obtain distance metrics for each transmitted stream.

After distance metrics for the transmitted streams are calculated at block 606, methodology 600 can conclude at block 608 by obtaining soft-decision outputs by calculating log-likelihood ratios (LLRs) for each bit in the transmitted streams based at least in part on the distance metrics determined at block 606. By way of specific example, LLRs can be determined for a kth bit $b_k$ in a transmitted stream $x_1$ using the LLR expression given by Equation (2) as follows:

$$L(b_k) = \frac{1}{\sigma_n^2}\left(\min_{x_1|b_k=0} d(x_1) - \min_{x_1|b_k=1} d(x_1)\right). \qquad (13)$$

Additionally, LLRs for the other transmitted streams in x can be computed using similar LLR expressions to those given in Equations (2) and (13).

Figure 7:
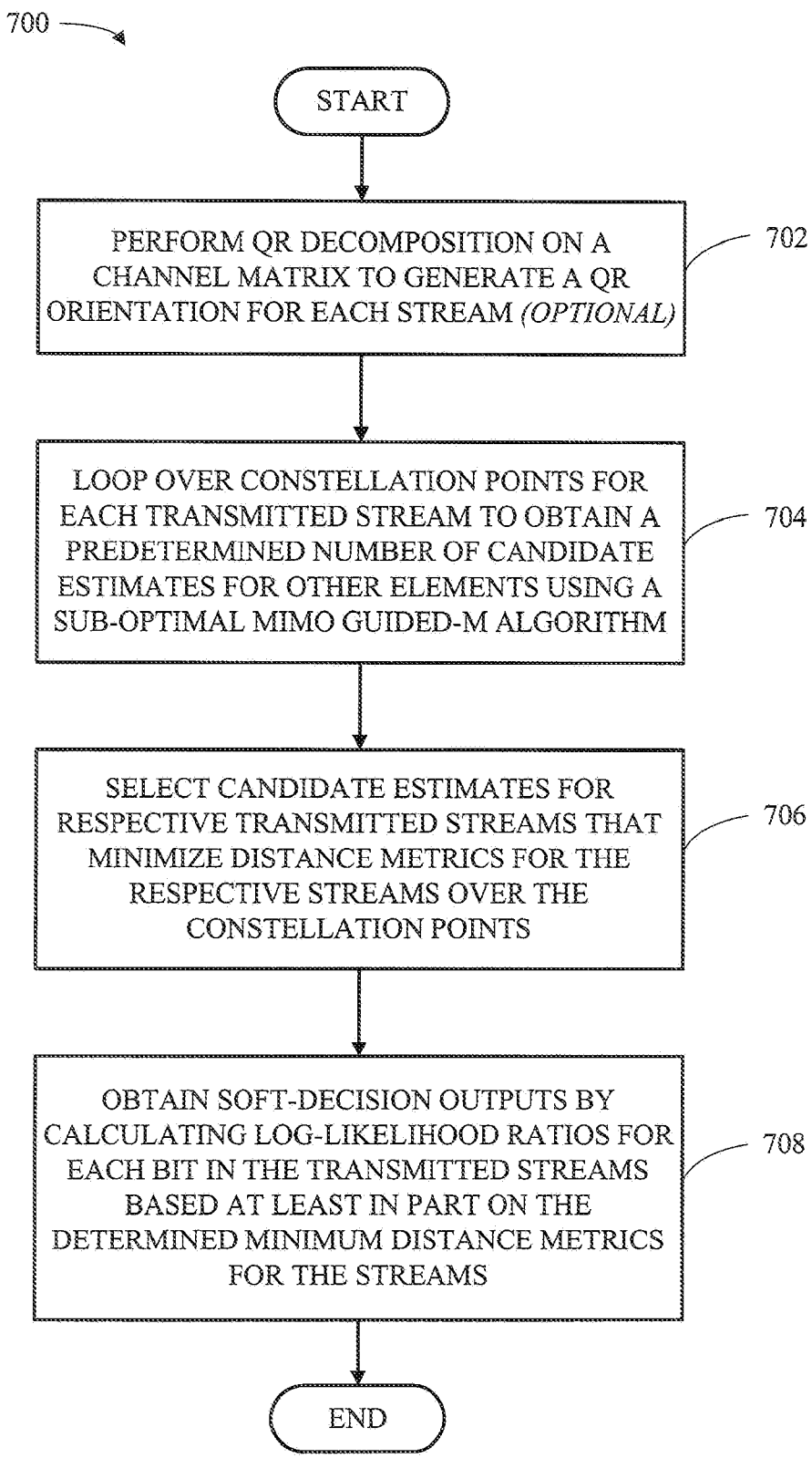
FIG. 7 is a flow diagram of a methodology for near-SOMLD in a MIMO communication system using a Guided-M algorithm.

With reference now to FIG. 7, a methodology 700 for near-SOMLD in a MIMO communication system using a Guided-M algorithm is illustrated. Methodology 700 can be performed, for example, by an access point, an access terminal, and/or any other suitable entity in a wireless communication network. In the following description, methodology 700 is generally described for a series of 3 transmitted streams (e.g., from 3 transmit antennas 218 at an AP 210). It should be appreciated, however, that methodology 700 can be similarly applied for any number of transmitted streams.

Methodology 700 can begin at block 702, wherein QR decomposition is performed on a channel matrix representing the effective MIMO channel to generate a QR orientation for each transmitted stream. In one example, QR decomposition can be performed at block 702 for three permutations of a channel matrix H as used in Equation (1) such that every row of H is permuted to be the last row only once. QR decomposition can then be performed on each permutation to obtain three QR "orientations." While the discussion of the following blocks in FIG. 7 generally relates to calculating soft-decision outputs based on QR orientations for each transmitted stream, it should be appreciated that QR decomposition at block 702 is optional and need not be performed as part of methodology 700 and that methodology 700 can be performed for a non-decomposed channel matrix in a similar manner to the following description.

Methodology 700 next proceeds to block 704, wherein looping over a set of constellation points is performed for each transmitted stream to obtain a predetermined number of candidate estimates for other elements needed for distance calculation using a sub-optimal MIMO Guided-M algorithm. As can be appreciated by one of ordinary skill in the art, full 3×3 SOMLD has exponential computational complexity. For example, full 3×3 SOMLD for a 64-QAM constellation conventionally requires a search over 64*64 possibilities. In other words, if an outer loop is performed over all possibilities of $x_3$, an inner loop over all possibilities of $x_2$ would need to be performed for all possibilities of $x_3$, from which slicing can be performed to get $x_1$. In contrast, using a Guided-M algorithm at block 704, required complexity is reduced by searching over only M points in the second dimension in a guided way.

By way of specific, non-limiting example, looping performed at block 704 can proceed as follows. The following description generally relates to a Guided-M algorithm that can be performed on a channel matrix decomposed using QR decomposition (e.g., at block 702), herein referred to as a QR Guided-M algorithm (QRGM). However, it should be appreciated that the looping at block 704 can be similarly performed for a non-decomposed channel matrix and/or a channel matrix decomposed using another decomposition technique.

First, prior to looping over the constellation points, an intermediate vector y' can be determined by using the equation y'=Q(1:$N_R$,1:$N_T$)$^H$y, where Q(1:$N_R$,1:$N_T$) represents the set of elements in Q having indices of 1 to $N_R$ by 1 to $N_T$. From the intermediate vector y', the transmitted stream $x_3$ can be looped over the set of constellation points to determine a second intermediate vector y" for each possible value of $x_3$ by using the equation y"=y'−R(1:3,3)$x_3$. Based on the intermediate vectors y" determined for each constellation point, an initial candidate estimate for corresponding transmitted stream $x_2$ can be estimated by using the equation $x_{2,est}$=Slice (y"$_2$/$r_{22}$), where y"$_2$ is the second element of y", Slice( ) is a slicing operation to the nearest constellation point, and $r_{22}$ is entry (2,2) of R. By finding $x_2$, an $l^1$-norm approximation of y"$_2$−$r_{22}x_2$, which is |Re(y"$_2$−$r_{22}x_2$)|+|Im(y"$_2$−$r_{22}x_2$)|, can then be determined.

Once the initial candidate estimate $x_{2,est}$ is determined, partial distance metrics of the four constellation points surrounding $x_{2,est}$ can be determined. In one example, the partial distance metrics can be determined by assuming that the vector y' is scaled such that $x_{2,est}$ is on a grid that can be expressed as {−7, −5, −3, −1, 1, 3, 5, 7}+j*{−7, −5, −3, −1, 1, 3, 5, 7}. Based on this representation, the four surrounding points can be chosen as $x_{2,est}$+[2, 2j, −2, −2j ]. In one example, an additional check is performed to ensure that the surrounding points do not fall outside the constellation boundaries. After the surrounding points are obtained, their partial distance metrics can be found by taking the intermediate value y"$_2$−$r_{22}x_{2,est}$, adding −$r_{22}$[2, 2j, −2, −2j], and then determining the four respective $l^1$-norm approximations.

A third intermediate value y'"$_1$ can be calculated for $x_{2,est}$ and its four surrounding points by using the equation y'"$_1$=y"$_1$−$r_{12}x_2$ for each point. From these equations, corresponding candidate estimates for transmitted stream $x_1$ can be estimated using the equation $x_1$=Slice(y'"$_1$/$r_{11}$). From the estimates of $x_1$, an $l^1$-norm approximation of y'"$_1$−$r_{11}x_1$ for each estimate, which is $|\text{Re}(y'''_1-r_{11}x_1)|+|\text{Im}(y'''_1-r_{11}x_1)|$, can be determined. For each set of candidate estimates, intermediate distance metrics can then be determined using the following equation:

$$d(x_2, x_3) = |\text{Re}(y'''_1 - r_{11}x_1)| + |\text{Im}(y'''_1 - r_{11}x_1)| + \\ |\text{Re}(y''_2 - r_{22}x_2)| + |\text{Im}(y''_2 - r_{22}x_2)| + |\text{Re}(y''_3)| + |\text{Im}(y''_3)| \quad (14)$$

From the distance metrics calculated using Equation (14) corresponding to the five initial candidate estimates of $x_2$, the estimate with the minimum distance metric can then be taken as a new estimate, which can be denoted as $x_{2,\,new\_est}$ and three new points surrounding the new estimate can be considered. For example, if $x_{2,\,new\_est} = x_{2,est}+2$, the new points can be determined by $x_{2,\,new\_est}+[2, 2j, -2j]$. It should be observed that $x_{2,new\_est}-2$ is not used since it results in $x_{2,est}$, which was already determined to not provide the minimum distance metric. Further checking can then be performed to ensure that the new points do not fall outside the constellation boundaries. After selection and checking of the new points, corresponding estimates for $x_1$ and the distance metrics of the three new points can be found in a similar manner to the above description regarding the points surrounding $x_{2,est}$. In the event that $x_{2,\,new\_est} = x_{2,est}$, block 704 can be terminated or four other points around $x_{2,est}$ from the set, such as $[2+2j, -2+2j, -2-2j, 2-2j]$, can be considered. Once the distance metrics are determined, $x_{2,new\_est}$ can be updated to reflect the point having the minimum of the distance metrics corresponding to the points $x_{2,new\_est}$ and its surrounding points. The above calculations can then be reiterated for the new $x_{2,new\_est}$ and its surrounding points.

In one example, block 704 continues until M candidate points for $x_2$ have been considered. Once this condition is satisfied, methodology 700 can continue to block 706, wherein the candidate values of $x_2$ and $x_1$ for which minimum distance metrics were determined are selected. Similar looping and distance metric calculation can then be performed at block 706 to obtain minimum distance metrics for each transmitted stream. Alternatively, the calculations at block 704 can be conducted by deriving a gradient and using the gradient to determine the candidate value of $x_2$ with the minimum distance. In such an example, to achieve similar performance as QRGM with M=8, only 4 points for $x_2$ need to be evaluated at the expense of the extra complexity to calculate the gradient.

After selecting the minimum distance metrics at block 706, methodology 700 concludes at block 708 by obtaining soft-decision outputs by calculating log-likelihood ratios (LLRs) for each bit in the transmitted streams based at least in part on the minimum distance metrics determined at block 706. By way of specific example, LLRs can be determined for a kth bit $b_k$ in a transmitted stream $x_1$ using the LLR expression given by Equation (2) as follows:

$$L(b_k) = \frac{1}{\sigma_n^2}\left(\min_{x_1|b_k=0} d(x_1) - \min_{x_1|b_k=1} d(x_1)\right). \quad (15)$$

Additionally, LLRs for the other transmitted streams in x can be computed using similar LLR expressions to those given in Equations (2) and (15).

Figure 8:
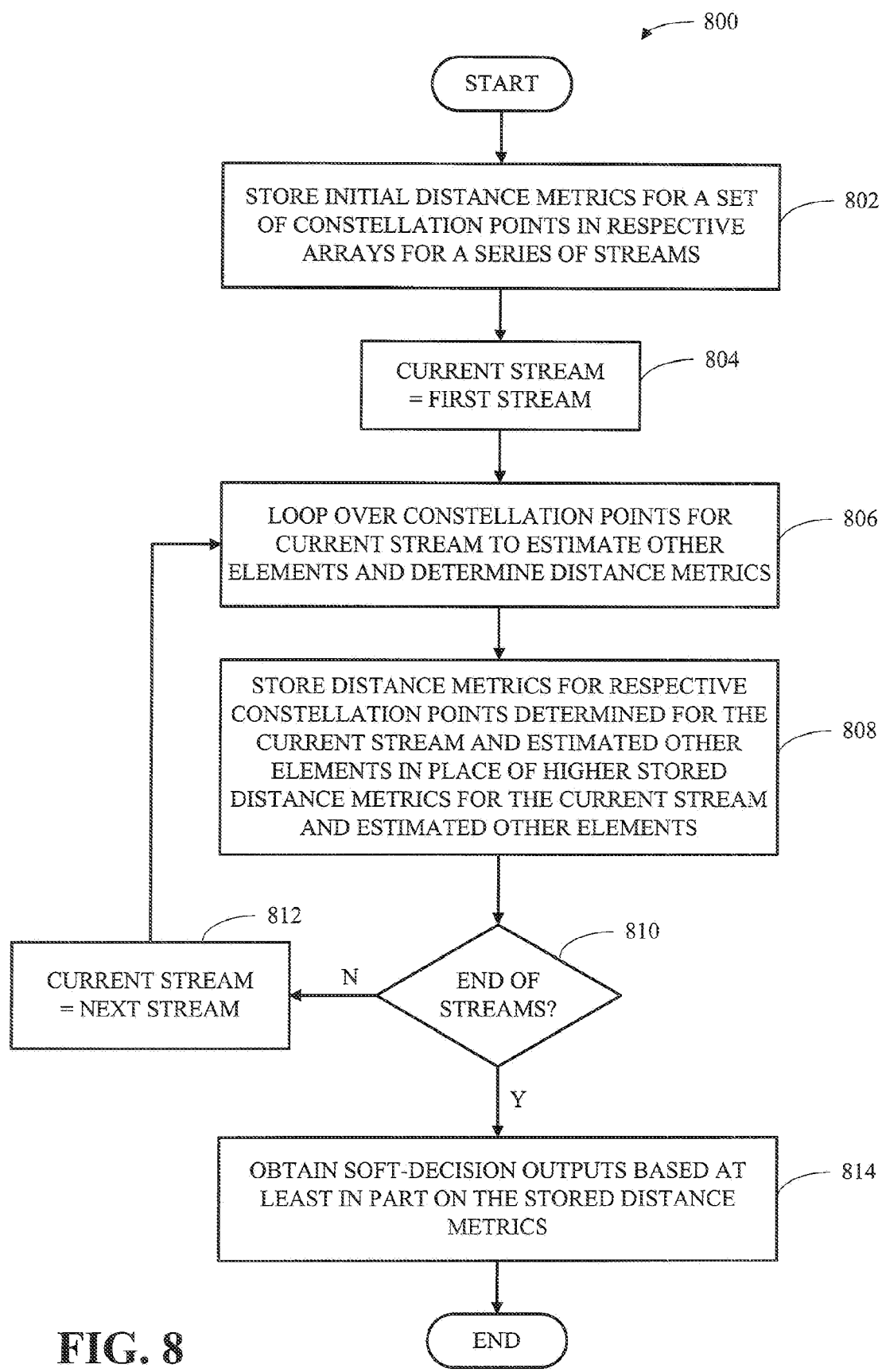
FIG. 8 is a flow diagram of a methodology for low-complexity soft-output detection in a MIMO communication system with Enhanced Metric Usage.

FIG. 8 illustrates a methodology 800 for low-complexity soft-output detection in a MIMO communication system with Enhanced Metric Usage (EMU). Methodology 800 can be performed, for example, by an access point, an access terminal, and/or any other suitable entity in a wireless communication network. In the following description, methodology 800 is generally described for a series of 3 transmitted streams (e.g., from 3 transmit antennas 218 at an AP 210). It should be appreciated, however, that methodology 800 can be similarly applied for any number of transmitted streams. The general idea behind EMU is to make more effective use of calculated distance metrics. For example, it can be observed that distance metrics found for a given $x_3$ actually also apply to the estimated $x_1$ and $x_2$ for that $x_3$. It can happen that the distance metric for the corresponding $x_2$, when going through a loop for $x_2$, is not as good. This may occur, for example, when column 2 of the channel matrix H through which $x_2$ is received suffers from fading. Thus, by reusing the distance metrics derived in the $x_3$ loop for $x_2$ values estimated in the $x_3$ loop, a kind of distance metric diversity order can be achieved.

The following description generally relates to EMU used with PSLD (e.g., a PSLD algorithm implemented by methodology 500). However, it should be appreciated that EMU can also be used with any other suitable near-SOMLD algorithm. Methodology 800 begins at block 802, wherein initial distance metrics are stored for a set of constellation points in respective arrays for a series of transmitted streams. In one example, for each received MIMO vector y, distance metric storage arrays can be initialized by setting distance metric storage arrays $d_{store}(x_1)$, $d_{store}(x_2)$, and $d_{store}(x_3)$ to a high value, such as a predetermined value MaxVal, for all $x_1$, $x_2$, and $x_3$, respectively.

Methodology 800 can then be initialized for a first transmitted stream at block 804, after which looping can be performed at blocks 806-810. At block 806, looping can be performed for a currently considered stream over a set of constellation points to estimate other elements needed for distance calculation and to determine distance metrics for the respective estimated elements. By way of specific, non-limiting example, looping for a transmitted stream $x_3$ can be performed at block 806 as follows.

Prior to looping over the constellation points, an intermediate vector y' can be determined by using the equation $y'=Q(1:N_R,1:N_T)^H y$. From the intermediate vector y', the transmitted stream $x_3$ can be looped over the set of constellation points to determine a second intermediate vector y" for each possible value of $x_3$ by using the equation $y''=y'-R(1:3,3)x_3$. Based on the intermediate vectors y" determined for each constellation point, corresponding transmitted streams $x_2$ can be estimated by using the equation $x_2=\text{SliceAndIndex}(y''_2/r_{22})$, where $y''_2$ is the second element of y", SliceAndIndex( ) is a slicing operation to the nearest constellation point that also returns the index of the constellation point for use at block 808, and $r_{22}$ is entry (2,2) of R. By finding $x_2$, an $l^1$-norm approximation of $y''_2-r_{22}x_2$, which is $|\text{Re}(y''_2-r_{22}x_2)|+|\text{Im}(y''_2-r_{22}x_2)|$, can then be determined. Based on this, a third intermediate value $y'''_1$ can be calculated using the equation $y'''_1=y''_1-r_{12}x_2$, and from this equation transmitted stream $x_1$ can be estimated using the equation $x_1=\text{SliceAndIndex}(y'''_1/r_{11})$. From the estimated value of $x_1$, an $l^1$-norm approximation of $y'''_1-r_{11}x_1$ that can be utilized at block 506, which is $|\text{Re}(y'''_1-r_{11}x_1)|+|\text{Im}(y'''_1-r_{11}x_1)|$, can be determined. A distance metric can then be calculated for the possible constellation points for $x_3$ and their corresponding estimated values of $x_1$ and $x_2$ using the approximated $l^1$-norm given by Equation (3) as follows:

$$d(x_1, x_2, x_3) = |\text{Re}(y_1''' - r_{11}x_1)| + |\text{Im}(y_1''' - r_{11}x_1)| + \quad (16)$$
$$|\text{Re}(y_2'' - r_{22}x_2)| + |\text{Im}(y_2'' - r_{22}x_2)| + |\text{Re}(y_3'')| + |\text{Im}(y_3'')|$$

Once the distance metrics are determined at block 806, methodology 800 can proceed to block 808, wherein distance metrics for respective constellation points determined for the current stream and estimated other elements are stored in place of higher stored distance metrics for the current stream and estimated other elements. More particularly, for a given transmitted stream $x_3$ and corresponding estimated values for $x_1$ and $x_2$, the stored distance metrics $d_{store}(\ )$ can be updated as follows:

$$d_{store}(x_1) = \min(d_{store}(x_1), d(x_1, x_2, x_3))$$
$$d_{store}(x_2) = \min(d_{store}(x_2), d(x_1, x_2, x_3))$$
$$d_{store}(x_3) = \min(d_{store}(x_3), d(x_1, x_2, x_3)) \quad (17)$$

After the distance metrics for the current stream are determined at block 808, methodology 800 then proceeds to block 810 to determine whether further transmitted streams are present. If further streams are present, methodology 800 advances to the next transmitted stream at block 812 and repeats blocks 806-810 for said stream. If no further transmitted streams are present, methodology 800 concludes at block 814 by obtaining soft-decision outputs based at least in part on the stored distance metrics. By way of specific, non-limiting example, soft-decision outputs can be generated at 814 by calculating log-likelihood ratios (LLRs) for each bit in the transmitted streams. For example, LLRs can be determined for a kth bit $b_k$ in a transmitted stream $x_1$ using the LLR expression given by Equation (2) for the stored distance metrics as follows:

$$L(b_k) = \frac{1}{\sigma_n^2}\left(\min_{x_1|b_k=0} d_{store}(x_1) - \min_{x_1|b_k=1} d_{store}(x_1)\right). \quad (18)$$

Alternatively, the minimum searches $d_{store}(x_1) = \min(d_{store}(x_1), d(x_1, x_2, x_3))$, etc., performed at block 808 can be combined with the above LLR calculation. In such an example, minimum searches $d_{store}(x_1) = \min(d_{store}(x_1), d(x_1, x_2, x_3))$, etc., are not performed at block 808, and instead each distance metric $d(x_1, x_2, x_3)$ for each respective combination of spatial streams can be stored at block 808 together with their corresponding $x_1$, $x_2$, and $x_3$. From this information, LLRs can then be calculated at block 814, as illustrated by the following:

$$L(b_k) = \frac{1}{\sigma_n^2}\left(\min_{x_1|b_k=0} d(x_1, x_2, x_3) - \min_{x_1|b_k=1} d(x_1, x_2, x_3)\right). \quad (19)$$

Thus, in an example of a 64-QAM constellation with three spatial transmit streams, 3*64=192 distance metrics can be searched over to find distance metrics for which the kth bit of $x_1$ is 0, after which the minimum $$\min_{x_1|b_k=0} d(x_1, x_2, x_3) \quad (20)$$

can be determined, and so on.

The minimum can be found over a large number of distance metrics, for example, by representing the minimum distance metrics as binary numbers and scanning each number from the Most Significant Bit (MSB) to the Least Significant Bit (LSB)). If the bits at a currently scanned bit position differ among the distance metrics, then distance metrics having a bit value of "1" on the currently scanned bit position can be labeled and removed from consideration as the minimum. If the LSB is reached, a single remaining candidate, or any one of the remaining candidates if multiple remaining candidates are present, can be utilized as the minimum distance metric. In another example, this minimum search algorithm can be applied at block 810 to the minimum searches required to calculate approximated LLRs as follows. First, for the minimum search over all $d(x_1,x_2,x_3)$ given that bit $b_k$ of $x_1$ is 0, all distance metrics for which bit $b_k$ of $x_1$ is 1 can be labeled and removed from consideration in the minimum search. Likewise, for the minimum search over all $d(x_1,x_2,x_3)$ given that bit $b_k$ of $x_1$ is 1, all distance metrics for which bit $b_k$ of $x_1$ is 0 can similarly be labeled and removed from consideration in the minimum search.

Figure 9:
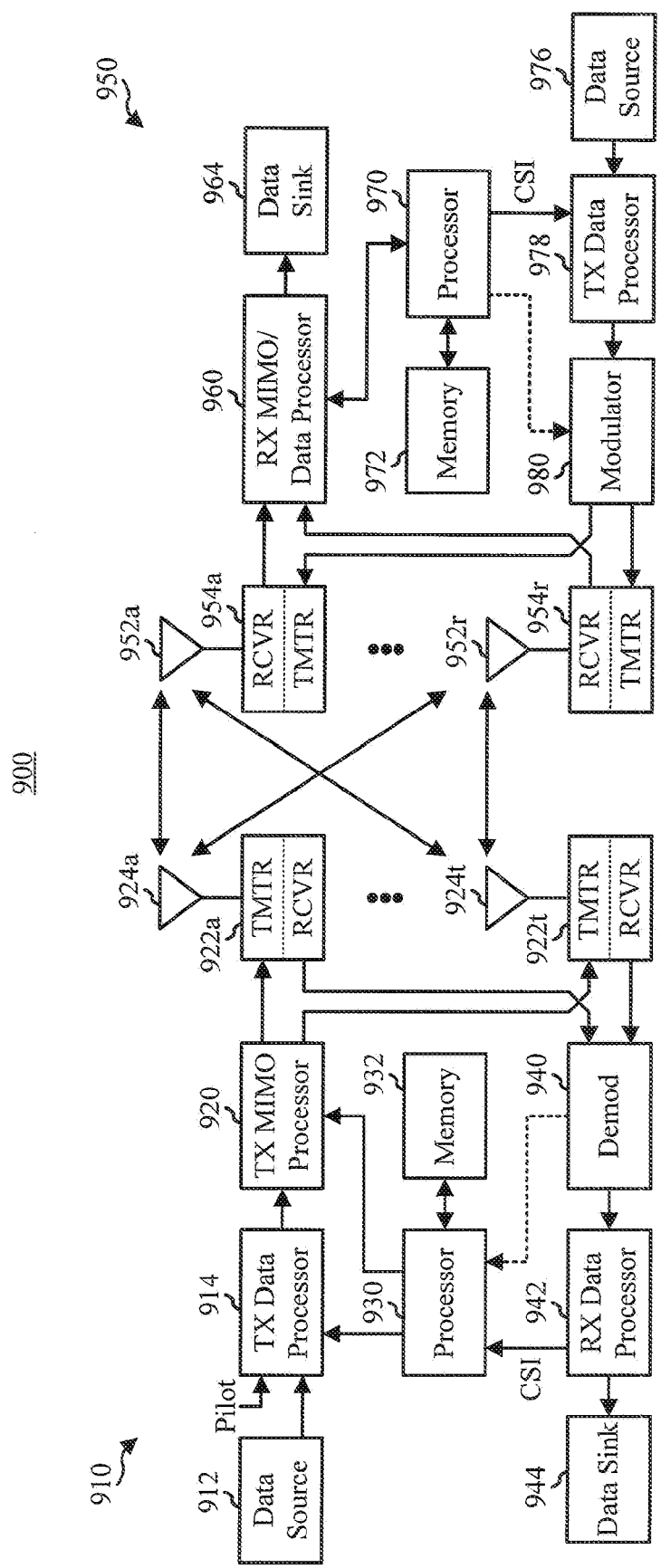
FIG. 9 is a block diagram illustrating an example wireless communication system in which one or more embodiments described herein may function.

Referring now to FIG. 9, a block diagram illustrating an example wireless communication system 900 in which one or more embodiments described herein may function is provided. In one example, system 900 is a multiple-input multiple-output (MIMO) system that includes a transmitter system 910 and a receiver system 950. It should be appreciated, however, that transmitter system 910 and/or receiver system 950 could also be applied to a multi-input single-output system wherein, for example, multiple transmit antennas (e.g., on a base station), may transmit one or more symbol streams to a single antenna device (e.g., a mobile station). Additionally, it should be appreciated that aspects of transmitter system 910 and/or receiver system 950 described herein could be utilized in connection with a single output to single input antenna system.

In accordance with one aspect, traffic data for a number of data streams are provided at transmitter system 910 from a data source 912 to a transmit (TX) data processor 914. In one example, each data stream can then be transmitted via a respective transmit antenna 924. Additionally, TX data processor 914 can format, code, and interleave traffic data for each data stream based on a particular coding scheme selected for each respective data stream in order to provide coded data. In one example, the coded data for each data stream may then be multiplexed with pilot data using OFDM techniques. The pilot data can be, for example, a known data pattern that is processed in a known manner. Further, the pilot data may be used at receiver system 950 to estimate channel response. Back at transmitter system 910, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream may be determined by instructions performed on and/or provided by processor 930.

Next, modulation symbols for all data streams can be provided to a TX MIMO processor 920, which may further process the modulation symbols (e.g., for OFDM). TX MIMO processor 920 may then provides $N_T$ modulation symbol streams to $N_T$ transmitters (TMTR) 922a through 922t. In one example, each transmitter 922 can receive and process a respective symbol stream to provide one or more analog signals. Each transmitter 922 may then further condition (e.g., amplify, filter, and upconvert) the analog signals to provide a modulated signal suitable for transmission over a MIMO channel. Accordingly, $N_T$ modulated signals from transmitters 922a through 922t can then be transmitted from $N_T$ antennas 924a through 924t, respectively.

In accordance with another aspect, the transmitted modulated signals can be received at receiver system 950 by $N_R$ antennas 952a through 952r. The received signal from each antenna 952 can then be provided to a respective receiver (RCVR) 954. In one example, each receiver 954 can condition (e.g., filter, amplify, and downconvert) a respective received signal, digitize the conditioned signal to provide samples, and then processes the samples to provide a corresponding "received" symbol stream. An RX MIMO/data processor 960 can then receive and process the $N_R$ received symbol streams from $N_R$ receivers 954 based on a particular receiver processing technique to provide $N_T$ "detected" symbol streams. In one example, each detected symbol stream can include symbols that are estimates of the modulation symbols transmitted for the corresponding data stream. RX MIMO/data processor 960 can then process each symbol stream at least in part by demodulating, deinterleaving, and decoding each detected symbol stream to recover traffic data for a corresponding data stream. After successful recovery, the stream can be provided to a data sink 964. Thus, the processing by RX MIMO/data processor 960 may be complementary to that performed by TX MIMO processor 920 and TX data processor 914 at transmitter system 910.

In another example, RX MIMO/data processor 960 may be limited in the number of subcarriers that it may simultaneously demodulate. For example, RX MIMO/data processor 960 may be limited to 512 subcarriers at 5 MHz, 128 subcarriers at 1.25 MHz, or 256 subcarriers at 2.5 MHz. In another example, RX MIMO/data processor 960 may be limited to 128 subcarriers at 40 MHz or 64 subcarriers at 20 MHz. Further, the channel response estimate generated by RX MIMO/data processor 960 may be used to perform space/time processing at the receiver, adjust power levels, change modulation rates or schemes, and/or other appropriate actions. Additionally, RX MIMO/data processor 960 may further estimate channel characteristics such as, for example, signal-to-noise-and-interference ratios (SNRs) of the detected symbol streams. RX MIMO/data processor 960 can then provide estimated channel characteristics to a processor 970. In one example, RX MIMO/data processor 960 and/or processor 970 can further derive an estimate of the "operating" SNR for the system. Processor 970 can then provide channel state information (CSI), which may comprise information regarding the communication link and/or the received data stream. This information may include, for example, the operating SNR. The CSI can then be processed by a TX data processor 978 (which can be coupled to a data source 976), modulated by a modulator 980, conditioned by transmitters 954a through 954r, and transmitted back to transmitter system 910.

Back at transmitter system 910, the modulated signals from receiver system 950 can then be received by antennas 924, conditioned by receivers 922, demodulated by a demodulator 940, and processed by a RX data processor 942 to recover the CSI reported by receiver system 950. After successful recovery, the stream can be provided to a data sink 944. In one example, the reported CSI can then be provided to processor 930 and used to determine data rates as well as coding and modulation schemes to be used for one or more data streams. The determined coding and modulation schemes can then be provided to transmitters 922 for quantization and/or use in later transmissions to receiver system 950. Additionally and/or alternatively, the reported CSI can be used by processor 930 to generate various controls for TX data processor 914 and TX MIMO processor 920.

In one example, processor 930 at transmitter system 910 and processor 970 at receiver system 950 direct operation at their respective systems. Additionally, memory 932 at transmitter system 910 and memory 972 at receiver system 950 can provide storage for program codes and data used by processors 930 and 970, respectively. Further, at receiver system 950, various processing techniques may be used to process the $N_R$ received signals to detect the $N_T$ transmitted symbol streams. In one example, these processing techniques can include one or more of methodologies 400, 500, 600, 700, 800, and/or any other appropriate technique for near-SOMLD. Additionally and/or alternatively, processing techniques utilized by receiver system 950 can include spatial and space-time receiver processing techniques, which may also be referred to as equalization techniques, and/or "successive nulling/equalization and interference cancellation" receiver processing techniques, which may also be referred to as "successive interference cancellation" or "successive cancellation" receiver processing techniques.

Figure 10:
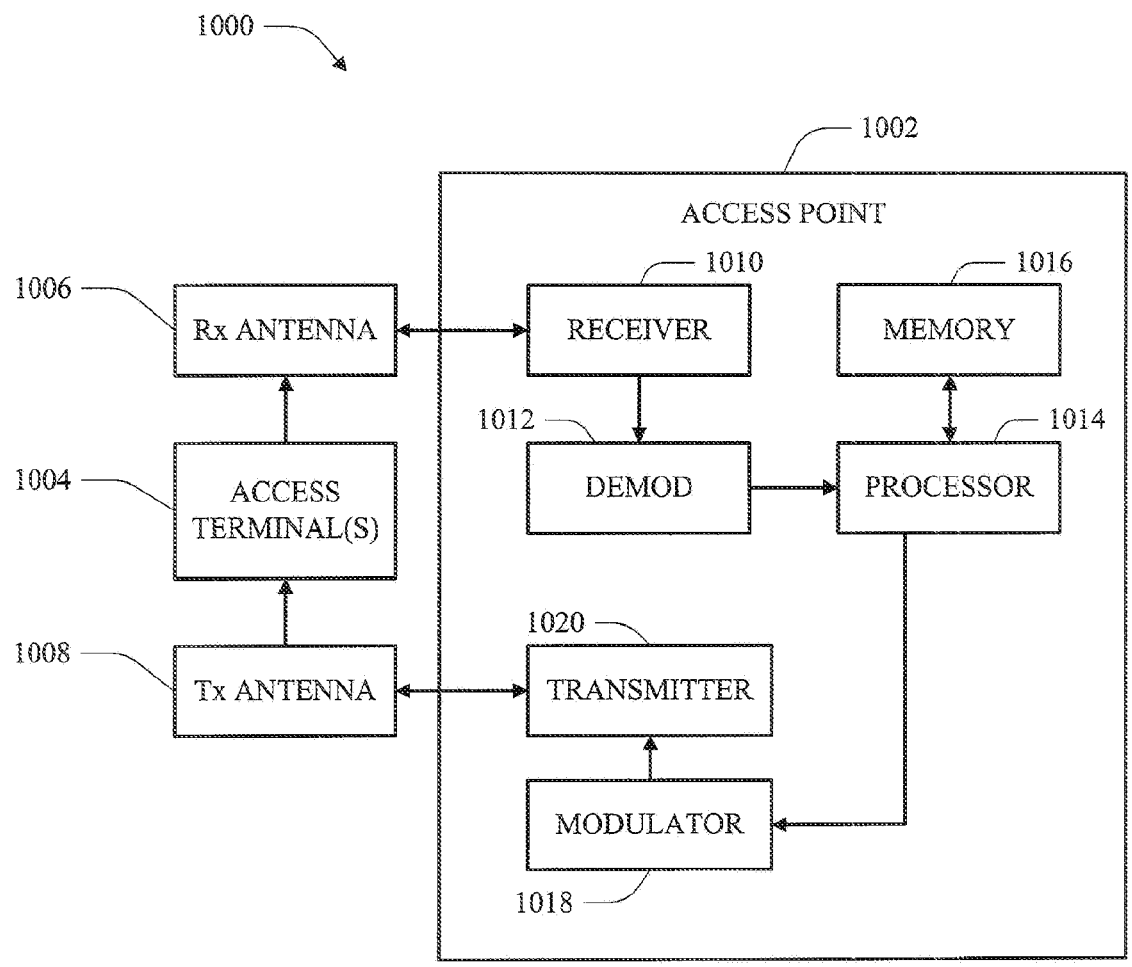
FIG. 10 is a block diagram of a system that coordinates modulation and transmission of spatial data streams in accordance with various aspects.

FIG. 10 is a block diagram of a system 1000 that coordinates modulation and transmission of spatial data streams in accordance with various aspects described herein. In one example, system 1000 includes a base station or access point 1002. As illustrated, access point 1002 can receive signal(s) from one or more access terminals 1004 via a receive (Rx) antenna 1006 and transmit to the one or more access terminals 1004 via a transmit (Tx) antenna 1008.

Additionally, access point 1002 can comprise a receiver 1010 that receives information from receive antenna 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, access point 1002 can employ demodulator 1012 and/or processor 1014 to perform methodologies 400, 500, 600, 700, 800, and/or other similar and appropriate methodologies. Access point 1002 can also include a modulator 1018 that can multiplex a signal for transmission by a transmitter 1020 through transmit antenna 1008 to one or more access terminals 1004.

Figure 11:
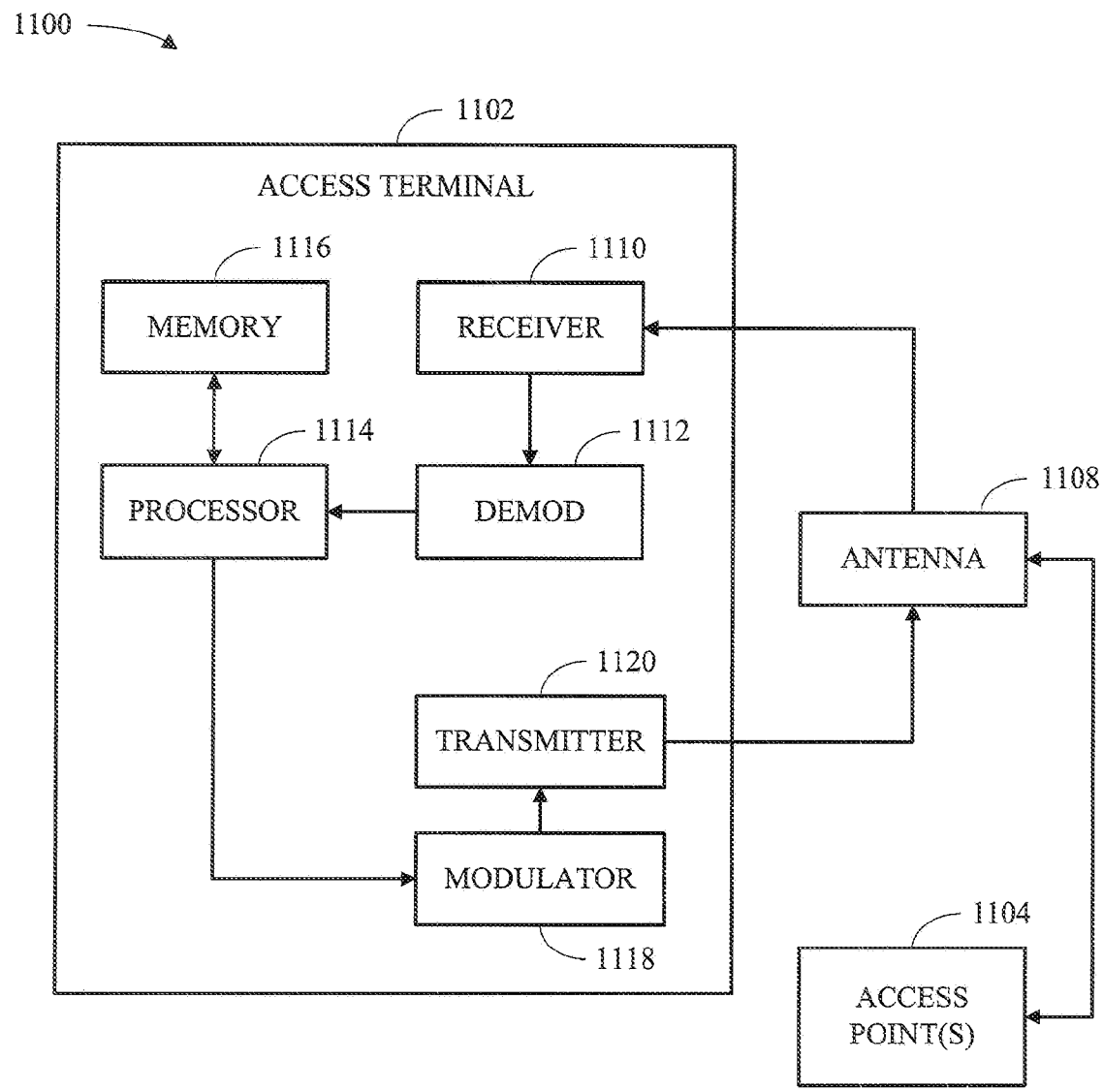
FIG. 11 is a block diagram of a system that coordinates reception and detection of spatial data streams in accordance with various aspects.

FIG. 11 is a block diagram of a system 1100 that coordinates reception and detection of spatial data streams in accordance with various aspects described herein. In one example, system 1100 includes an access terminal 1102. As illustrated, access terminal 1102 can receive signal(s) from one or more access points 1104 and transmit to the one or more access points 1104 via an antenna 1108. Additionally, access terminal 1102 can comprise a receiver 1110 that receives information from antenna 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to access terminal 1102. Additionally, access terminal 1102 can employ demodulator 1112 and/or processor 1114 to perform methodologies 400, 500, 600, 700, 800, and/or other similar and appropriate methodologies. Access terminal 1102 can also include a modulator 1118 that can multiplex a signal for transmission by a transmitter 1120 through antenna 1108 to one or more access points 1104.

Figure 12:
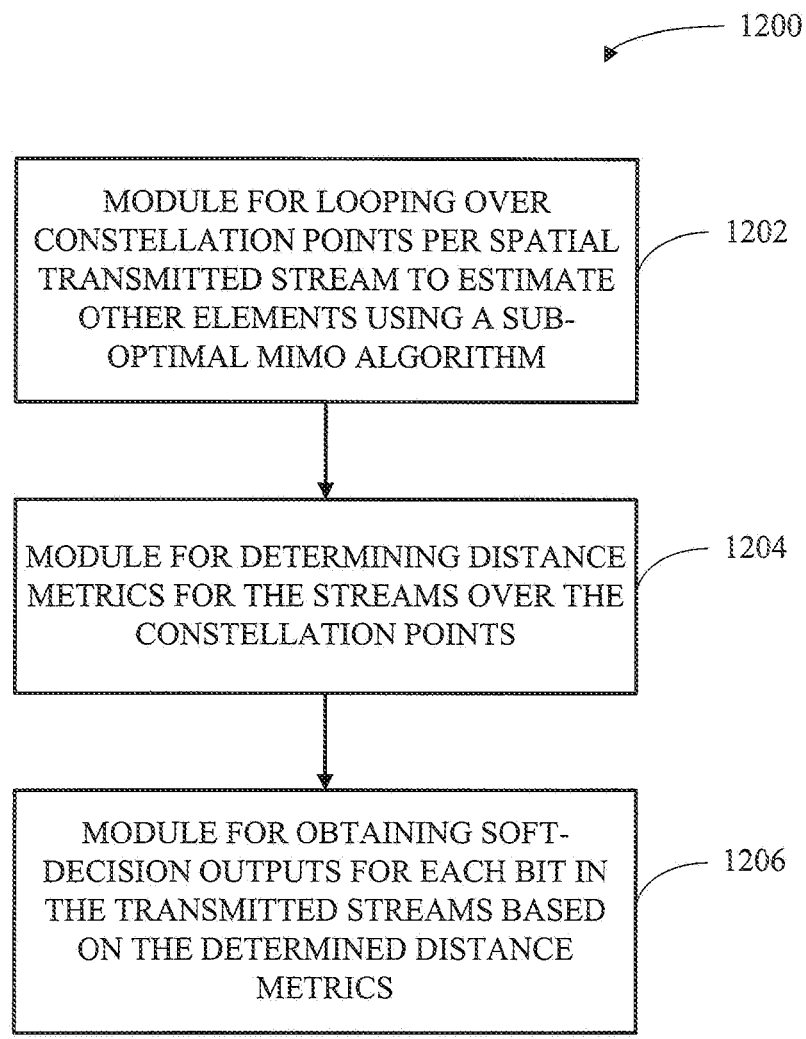
FIG. 12 is a block diagram of an apparatus that provides near soft-output maximum likelihood detection in accordance with various aspects.

FIG. 12 illustrates an apparatus 1200 that provides near soft-output maximum likelihood detection. It is to be appreciated that apparatus 1200 is represented as including functional blocks, which can be functional blocks that represent functions implemented by a processor, software, or combination thereof (e.g., firmware). Apparatus 1200 can be implemented in a base station (e.g., an AP 210) and/or a terminal (e.g., an AT 220) and can include a module for looping over constellation points per spatial transmitted stream to estimate other elements using a sub-optimal MIMO algorithm 1202. Further, apparatus 1200 can include a module for determining distance metrics for the streams over the constellation points 1204 and a module for obtaining soft-decision outputs for each bit in the transmitted streams based on the determined distance metrics 1206.

Figure 13:
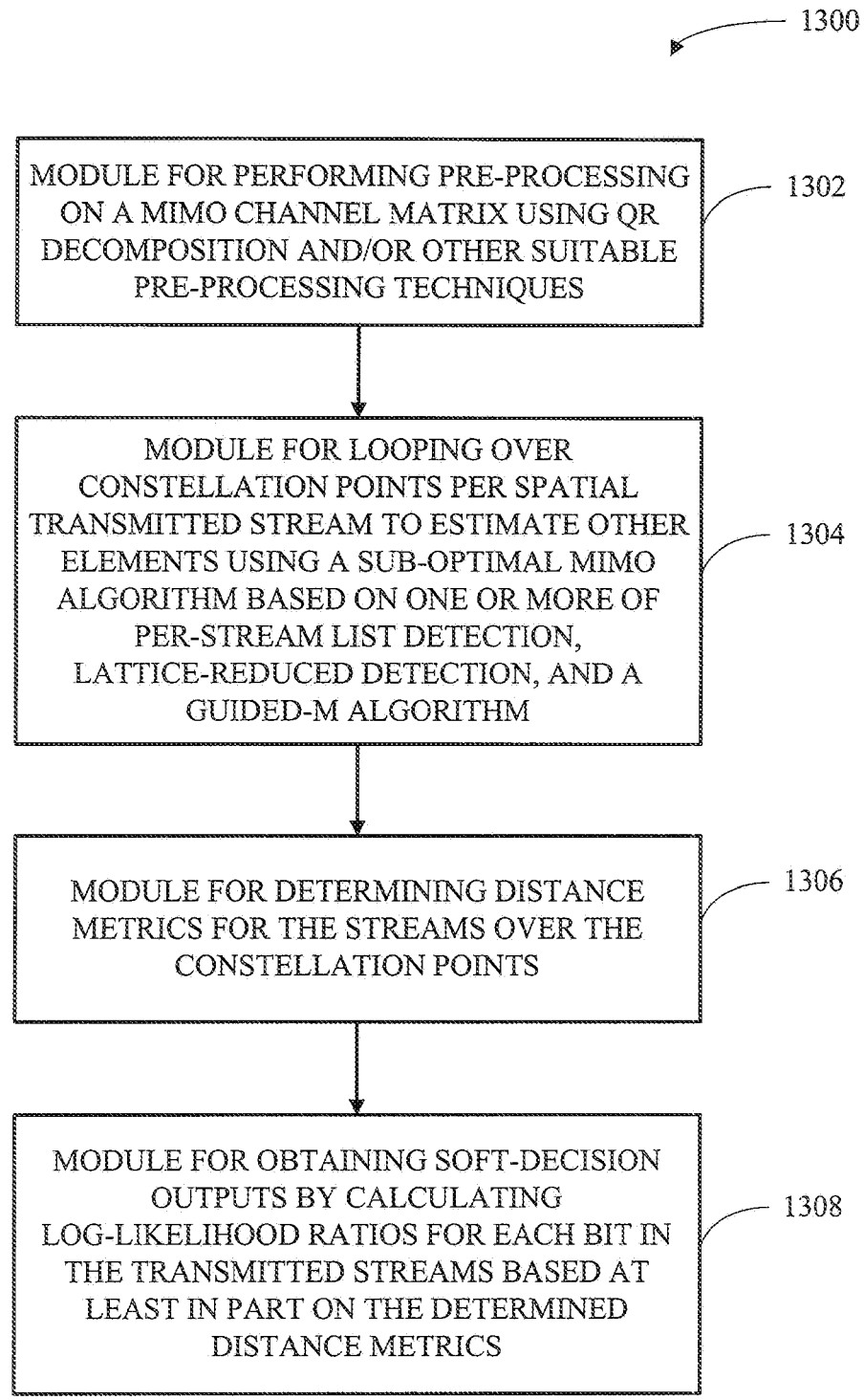
FIG. 13 is a block diagram of an apparatus that provides near soft-output maximum likelihood detection via MIMO channel matrix pre-processing and utilization of sub-optimal MIMO algorithms in accordance with various aspects.

FIG. 13 illustrates an apparatus 1300 that provides near soft-output maximum likelihood detection via MIMO channel matrix pre-processing and utilization of sub-optimal MIMO algorithms. It is to be appreciated that apparatus 1300 is represented as including functional blocks, which can be functional blocks that represent functions implemented by a processor, software, or combination thereof (e.g., firmware). Apparatus 1300 can be implemented in a base station (e.g., an AP 210) and/or a terminal (e.g., an AT 220) and can include a module for performing pre-processing on a MIMO channel matrix using QR decomposition and/or other suitable pre-processing techniques 1302. Further, apparatus 1300 can comprise a module for looping over constellation points per spatial transmitted stream to estimate other elements using a sub-optimal MIMO algorithm based on one or more of PSLD, LRD, and a Guided-M algorithm 1304; a module for determining distance metrics for the streams over the constellation points 1306; and a module for obtaining soft-decision outputs by calculating log-likelihood ratios for each bit in the transmitted streams based at least in part on the determined distance metrics 1308.

Figure 14:
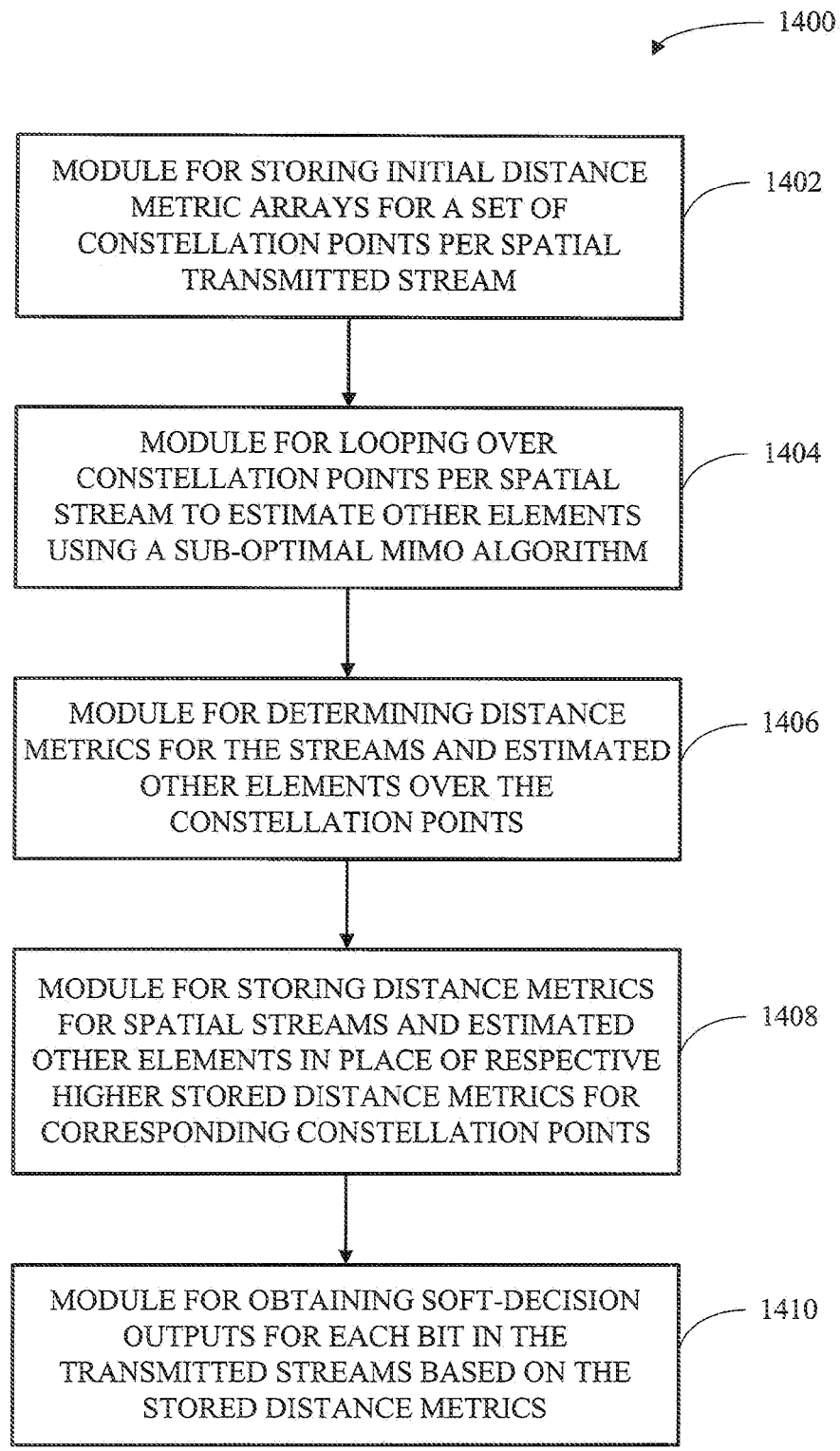
FIG. 14 is a block diagram of an apparatus that provides near soft-output maximum likelihood detection with Enhanced Metric Usage in accordance with various aspects.

FIG. 14 illustrates an apparatus 1400 that provides near soft-output maximum likelihood detection with Enhanced Metric Usage. It is to be appreciated that apparatus 1400 is represented as including functional blocks, which can be functional blocks that represent functions implemented by a processor, software, or combination thereof (e.g., firmware). Apparatus 1400 can be implemented in a base station (e.g., an AP 210) and/or a terminal (e.g., an AT 220) and can include a module for storing initial distance metric arrays for a set of constellation points per spatial transmitted stream 1402. Further, apparatus 1400 can comprise a module for looping over constellation points per spatial stream to estimate other elements using a sub-optimal MIMO algorithm 1404, a module for determining distance metrics for the streams and estimated other elements over the constellation points 1406, a module for storing distance metrics for spatial streams and estimated other elements in place of respective higher stored distance metrics for corresponding constellation points 1408, and a module for obtaining soft-decision outputs for each bit in the transmitted streams based on the stored distance metrics 1410.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for generating soft-decision output values for a set of transmitted spatial streams in a multiple-input multiple-output (MIMO) communication system, comprising:
   looping, by a processor in a wireless communication apparatus, over the set of transmitted spatial streams and for a respective transmitted spatial stream:
   determining a plurality of constellation points for the respective transmitted spatial stream to estimate values for the constellation points of the other transmitted streams based at least in part on a sub-optimal MIMO algorithm without looping over all possible combinations of the constellation points of the other transmitted streams;
   determining a set of distance metrics as values of the plurality of constellation points for the respective transmitted spatial stream; and
   generating soft-decision outputs for the respective transmitted stream based at least in part on the set of distance metrics.

2. The method of claim 1, wherein the sub-optimal MIMO algorithm is based at least on Per-Stream List Detection (PSLD).

3. The method of claim 2, wherein the sub-optimal MIMO algorithm based at least on PSLD includes zero forcing with successive interference calculation.

4. The method of claim 1, wherein the determining the plurality of constellation points includes:
   applying at least one of a scaling factor and a shifting factor to a channel matrix that represents an effective MIMO channel through which the set of transmitted spatial streams are received to convert respective entries in the channel matrix to complex integers; and
   wherein the sub-optimal MIMO algorithm is based at least on Lattice-Reduced Detection (LRD).

5. The method of claim 1, wherein the determining the plurality of constellation points includes:

obtaining a predetermined number of estimated candidate values for other transmitted streams using a sub-optimal MIMO Guided-M algorithm; and selecting estimated candidate values for the respective other transmitted streams that minimize respective distance metrics for the respective transmitted stream over the set of constellation points.

6. The method of claim 1, further comprising decomposing a channel matrix that represents an effective MIMO channel through which the set of transmitted spatial streams are received, wherein the determining the plurality of constellation points includes estimating values for other transmitted streams using the decomposed channel matrix.

7. The method of claim 6, wherein the decomposing the channel matrix includes performing QR decomposition on the channel matrix.

8. The method of claim 1, further comprising:
storing initial distance metrics for a set of constellation points for the set of transmitted streams; wherein the determining the set of distance metrics includes:
determining distance metrics as values of the plurality of constellation points for respective sets of transmitted spatial streams and corresponding estimated values for other transmitted streams,
storing distance metrics for respective sets of transmitted spatial streams and corresponding estimated values for other transmitted streams in place of higher stored distance metrics for the respective sets of transmitted spatial streams and corresponding estimated values for other transmitted streams; and
wherein the generating soft-decision outputs includes generating soft-decision outputs for the respective transmitted streams based at least in part on the stored distance metrics.

9. The method of claim 1, further comprising generating harddecision outputs for the respective transmitted stream based at least in part on the generated soft-decision outputs.

10. The method of claim 1, further comprising:
generating hard-decision outputs for the respective transmitted stream by searching for a minimum distance metric for a transmitted stream in the respective transmitted streams; and
obtaining hard-decision outputs for the transmitted stream and corresponding estimates for other respective transmitted streams based at least in part on a reverse constellation mapping.

11. The method of claim 1, wherein the set of distance metrics comprise soft-decision input values respectively representing estimated values of the transmitted spatial stream.

12. The method of claim 11, wherein the soft-decision input values are generated by a decoder using an outer code.

13. The method of claim 1, wherein the determining the set of distance metrics includes determining the set of distance metrics as values of the plurality of constellation points for the respective transmitted spatial stream using at least one of an approximated $l^1$-norm, an $l^1$-norm, an $l^2$-norm, and an $l^\infty$-norm.

14. The method of claim 1, wherein the generating soft-decision outputs for the respective transmitted stream includes calculating log-likelihood ratios for respective bits in the transmitted streams based at least in part on the set of distance metrics.

15. The method of claim 1, wherein the respective transmitted spatial stream is modulated using phase-shift keying (PSK).

16. The method of claim 1, wherein the respective transmitted spatial stream is modulated using quadrature amplitude modulation (QAM).

17. The method of claim 1, wherein the set of transmitted spatial streams are allocated among a plurality of subcarriers using orthogonal frequency division multiplexing (OFDM), wherein:
the determining includes determining a plurality of constellation points for the respective transmitted spatial stream allocated to respective subcarriers,
the determining the set of distance metrics includes determining distance metrics for respective transmitted spatial stream allocated to respective subcarriers, and
the generating soft-decision outputs includes generating soft-decision outputs for respective transmitted stream allocated to respective subcarriers.

18. The method of claim 1, wherein the determining the plurality of constellation points includes determining based on one or more of zero forcing and a minimum mean square error algorithm.

19. The method of claim 1, wherein the determining the plurality of constellation points includes determining the plurality of constellation points for respective subsets of the set of transmitted spatial streams to estimate values for transmitted streams not in the respective subsets based on the sub-optimal MIMO algorithm.

20. A wireless communications apparatus, comprising:
a memory that stores data relating to a set of received streams and a matrix corresponding to a channel through which a set of transmitted streams corresponding to the set of received streams were communicated; and
a processor configured to loop over the set of transmitted spatial streams and for a respective transmitted spatial stream, to determine one or more constellation points for the respective transmitted stream to determine estimated values for the constellation points of the other transmitted streams and corresponding distance metrics using the matrix and a sub-optimal MIMO algorithm without looping over all possible combinations of the constellation points of the other transmitted streams, and to generate soft-decision outputs for the respective transmitted stream based at least in part on the distance metrics,
wherein the soft-decision outputs for the respective transmitted stream are generated as log-likelihood ratios of the determined distance metrics.

21. The wireless communications apparatus of claim 20, wherein the processor is further configured to determine one or more constellation points for the respective transmitted stream to determine estimated values for other transmitted streams and corresponding distance metrics using the matrix and the sub-optimal MIMO algorithm based on Per-Stream List Detection (PSLD).

22. The wireless communications apparatus of claim 20, wherein the processor is further configured:
to perform at least one of a scaling operation and a shifting operation on the matrix to convert the matrix to a complex integer representation; and
to determine estimated values for other transmitted streams and corresponding distance metrics using the matrix and the sub-optimal MIMO algorithm based on Lattice-Reduced Detection (LRD).

23. The wireless communications apparatus of claim 20, wherein the processor is further configured:
to determine one or more constellation points for the respective transmitted stream to obtain a predetermined number of estimated candidates for other transmitted streams and corresponding distance metrics using the matrix and a MIMO Guided-M algorithm; and to select estimated candidates for the respective other transmitted streams having minimum corresponding distance metrics for the respective transmitted stream over the set of constellation points.

24. The wireless communications apparatus of claim 20, wherein the processor is further configured:

to process the matrix using a matrix decomposition technique; and to determine estimated values for other transmitted streams and corresponding distance metrics using the processed matrix and the sub-optimal MIMO algorithm.

25. The wireless communications apparatus of claim 24, wherein the processor is further configured to process the matrix using QR decomposition.

26. The wireless communications apparatus of claim 20, wherein:

the memory further stores data relating to respective arrays for storage of distance metrics for the set of transmitted streams over the one or more constellation points; and the processor is further configured:

to store initial distance metrics for the set of transmitted streams over the one or more constellation points in the respective arrays;

to determine estimated values for other transmitted streams and corresponding distance metrics;

to store corresponding distance metrics in the respective arrays for sets of respective transmitted streams and estimated values for the other transmitted streams in place of higher corresponding stored distance metrics in the respective arrays; and to generate soft-decision outputs for the respective transmitted streams as log-likelihood ratios of the stored distance metrics.

27. The wireless communications apparatus of claim 20, wherein the processor is further configured to generate hard-decision outputs for the respective transmitted streams based on the determined distance metrics.

28. The wireless communications apparatus of claim 20, wherein the memory further stores data relating to soft-decision input values for the set of received streams.

29. The wireless communications apparatus of claim 20, wherein the processor is further configured to determine distance metrics using at least one of an approximated $l^1$-norm, an $l^1$-norm, an $l^2$-norm, and an $l^\infty$-norm.

30. The wireless communications apparatus of claim 20, wherein the received streams are modulated using one or more of PSK and QAM.

31. The wireless communications apparatus of claim 20, wherein:

the memory further stores data relating to respective frequency subcarriers having received streams allocated thereto based on OFDM; and the processor is further configured to generate soft-decision outputs for the respective transmitted stream for the respective frequency subcarriers.

32. A system that facilitates multi-user detection in a wireless communication system comprising the wireless communications apparatus of claim 20.

33. A communication system apparatus that provides low-complexity near-soft-output maximum likelihood detection for a series of transmitted streams, comprising:

means for looping over a set of transmitted spatial streams and for a respective transmitted spatial stream using:

means for determining a set of constellation points for the respective transmitted stream to estimate values for the constellation points of other transmitted streams using a suboptimal MIMO algorithm without looping over all possible combinations of the constellation points of the other transmitted streams;

means for determining distance metrics for the respective transmitted stream over the set of constellation points; and means for obtaining soft-decision outputs for respective bits in the transmitted stream based on the determined distance metrics.

34. The communication system apparatus of claim 33, wherein the sub-optimal MIMO algorithm is based at least on Per-Stream List Detection (PSLD).

35. The communication system apparatus of claim 33, wherein the means for determining the set of constellation points includes:

means for scaling and shifting a channel matrix to convert respective entries in the channel matrix to complex integers; and means for estimating the other values using the channel matrix and the sub-optimal MIMO algorithm based on Lattice-Reduced Detection (LRD).

36. The communication system apparatus of claim 33, wherein the means for determining the set of constellation points includes:

means for determining the set of constellation points for respective transmitted streams to generate estimated candidate values for the other values using a sub-optimal MIMO Guided-M algorithm; and means for selecting respective estimated candidate values for the other values that minimize respective distance metrics for the transmitted streams over the set of constellation points.

37. The communication system apparatus of claim 33, further comprising means for processing a channel matrix based at least in part on QR decomposition, wherein the means for determining the set of constellation points includes means for estimating other values using the channel matrix and the sub-optimal MIMO algorithm.

38. The communication system apparatus of claim 33, further comprising:

means for storing initial distance metrics for the set of constellation points that respectively correspond to the series of transmitted streams; and wherein the means for determining distance metrics includes:

means for determining distance metrics for the respective transmitted stream and respective estimated other values over the set of constellation points, and means for storing distance metrics for respective sets of transmitted spatial streams and estimated other values in place of corresponding higher stored distance metrics; and wherein the means for obtaining soft-decision outputs includes means for obtaining soft-decision outputs for respective bits in the transmitted streams based on the stored distance metrics.

39. The communication system apparatus of claim 33, wherein the means for obtaining soft-decision outputs includes means for calculating log-likelihood ratios for respective bits in the transmitted streams based at least in part on the determined distance metrics.

40. The communication system apparatus of claim 33, wherein the means for determining includes means for estimating other values using one or more of zero forcing, zero forcing with successive interference cancellation, and a minimum mean square error algorithm.

41. The communication system apparatus of claim 33, wherein the means for determining includes means for estimating transmitted streams that are not in the respective subsets using the sub-optimal MIMO algorithm.

42. A multiple-input multiple-output wireless communication system comprising the apparatus of claim 33.

43. A multi-mode fiber-optic communication system comprising the apparatus of claim 33.

44. A non-transitory computer-readable medium having stored thereon computer-executable instructions for soft value generation for a set of transmitted streams in a wireless communication system, the instructions comprising:
  code for looping over the set of transmitted spatial streams and for a respective transmitted spatial stream executing:
    code for utilizing a channel matrix and a sub-optimal MIMO algorithm to iteratively-determine a plurality of constellation points for the respective transmitted spatial stream to estimate values for the constellation points of other transmitted streams based at least in part on a suboptimal MIMO algorithm without looping over all possible combinations of the constellation points of the other transmitted streams;
    code for determining a set of distance metrics as values of the plurality of constellation points for the respective transmitted spatial stream; and
    code for obtaining soft-decision outputs for respective bits in the set of transmitted streams based on the distance metrics.

45. The non-transitory computer-readable medium of claim 44, wherein the code for utilizing the channel matrix and the sub-optimal MIMO algorithm includes code for utilizing the channel matrix and the sub-optimal MIMO algorithm based at least in part on Per-Stream List Detection (PSLD).

46. The non-transitory computer-readable medium of claim 44, wherein the code for utilizing the channel matrix and the sub-optimal MIMO algorithm includes code for utilizing the channel matrix and the sub-optimal MIMO algorithm based at least in part on Lattice-Reduced Detection (LRD).

47. The non-transitory computer-readable medium of claim 44, wherein the code for utilizing the channel matrix and the sub-optimal MIMO algorithm includes:
  code for utilizing the channel matrix and the sub-optimal MIMO algorithm iteratively over the set of possible constellation points for the respective transmitted stream in the set of transmitted streams to estimate candidate values for other transmitted streams in the set of transmitted streams; and
  code for determining distance metrics at least in part by selecting respective candidate values for the other transmitted streams that minimize respective distance metrics for the respective transmitted stream over the set of possible constellation points.

48. The non-transitory computer-readable medium of claim 44, further comprising code for processing the channel matrix based at least in part on QR decomposition.

49. The non-transitory computer-readable medium of claim 44, wherein the code for obtaining soft-decision outputs includes code for calculating log-likelihood ratios for respective bits in the set of transmitted streams based on the distance metrics.

50. The non-transitory computer-readable medium of claim 44, further comprising:
  code for storing initial distance metrics for the set of possible constellation points in a set of arrays that respectively correspond to the set of transmitted streams,
  wherein the code for utilizing the channel matrix and the sub-optimal MIMO algorithm includes:
    code for iterating over the respective transmitted stream to estimate corresponding other transmitted streams and to determine corresponding distance metrics; and
    code for storing a determined distance metric for a constellation point in an array corresponding to a transmitted stream or a corresponding estimated stream if the determined distance metric is lower than a stored distance metric in the array for the constellation point.

51. A multiple-input multiple-output (MIMO) receiving device for performing low-complexity soft-output detection, comprising:
  a processor;
  memory in electronic communication with the processor;
  instructions stored in the memory, the instructions comprising:
  code for looping over a set of transmitted spatial streams and for a respective transmitted spatial stream executing:
    code for determining a plurality of constellation points for the respective transmitted spatial stream to estimate values for the constellation points of the other transmitted streams based at least in part on a sub-optimal MIMO algorithm without looping over all possible combinations of the constellation points of the other transmitted streams;
    code for determining a set of distance metrics as values of the plurality of constellation points for the respective transmitted spatial stream; and
    code for obtaining hard-decision outputs for respective bits in the transmitted streams based on the distance metrics.

52. The processor of claim 51, wherein the instructions further comprise code for obtaining soft-decision outputs by calculating log-likelihood ratios for respective bits in the transmitted streams based on the distance metrics.

53. The processor of claim 51, wherein the code for determining the plurality of constellation points includes code for using the sub-optimal MIMO algorithm based on at least one of Per-Stream List Detection, Lattice-Reduced Detection, a Guided-M algorithm, Zero Forcing, and a Minimum Mean Square Error algorithm.

54. The processor of claim 53, wherein the instructions further comprise:
  code for performing QR decomposition on a channel matrix that represents an effective MIMO channel through which the transmitted streams are received,
  wherein the code for determining one or more of the constellation points includes code for estimating other values and to determine corresponding distance metrics using the channel matrix and the sub-optimal MIMO algorithm.

55. The processor of claim 53, wherein the code for determining one or more of the constellation points includes:
  code for estimating other values and to determine corresponding distance metrics using the sub-optimal MIMO algorithm;
  code for comparing the determined corresponding distance metrics to respective stored distance metrics for the transmitted streams and estimated other values; and code for storing the determined corresponding distance metrics in place of respective stored distance metrics that are higher than the determined corresponding distance metrics.

56. A method for generating soft-decision output values for a set of transmitted spatial streams in a communication system, comprising:

looping over the set of transmitted spatial streams and for a respective transmitted spatial stream:

determining a plurality of constellation points for the respective transmitted spatial stream to estimate values for the constellation points of the other transmitted streams based at least in part on a single-input single-output (SISO) algorithm without looping over all possible combinations of the constellation points of the other transmitted streams;

determining a set of distance metrics as values of the plurality of constellation points for the respective transmitted spatial stream; and generating soft-decision outputs for the respective transmitted stream based at least in part on the set of distance metrics.

57. The method of claim 56, further comprising generating harddecision outputs for the respective transmitted stream based at least in part on the generated soft-decision outputs.

58. The method of claim 56, further comprising:

generating hard-decision outputs for the respective transmitted stream by searching for a minimum distance metric for a transmitted stream in respective transmitted streams; and obtaining hard-decision outputs for the transmitted stream and corresponding estimates for other transmitted streams based at least in part on a reverse constellation mapping.

59. The method of claim 56, wherein the set of distance metrics comprise soft-decision input values respectively representing estimated values of the transmitted spatial streams.

60. The method of claim 59, wherein the soft-decision input values are generated by a decoder using an outer code.

* * * * *